United States Patent
Yang et al.

(10) Patent No.: US 12,320,966 B2
(45) Date of Patent: Jun. 3, 2025

(54) METHOD AND SYSTEM FOR MULTI-VIEW EPISCOPIC SELECTIVE PLANE ILLUMINATION MICROSCOPE

(71) Applicant: Chan Zuckerberg Biohub, Inc., San Francisco, CA (US)

(72) Inventors: Bin Yang, San Francisco, CA (US); Loic Royer, San Francisco, CA (US)

(73) Assignee: CZ Biohub SF, LLC, San Francisco, CA (US)

( * ) Notice: Subject to any disclaimer, the term of this patent is extended or adjusted under 35 U.S.C. 154(b) by 128 days.

(21) Appl. No.: 18/162,067

(22) Filed: Jan. 31, 2023

(65) Prior Publication Data
US 2023/0168484 A1    Jun. 1, 2023

Related U.S. Application Data

(63) Continuation of application No. PCT/US2021/044549, filed on Aug. 4, 2021.
(Continued)

(51) Int. Cl.
*H04N 13/207* (2018.01)
*G01N 21/64* (2006.01)
(Continued)

(52) U.S. Cl.
CPC ....... *G02B 21/008* (2013.01); *G01N 21/6456* (2013.01); *G02B 21/0048* (2013.01);
(Continued)

(58) Field of Classification Search
CPC .............. G02B 21/008; G02B 21/0048; G02B 21/0076; G02B 26/101; H04N 13/207;
(Continued)

(56) References Cited

U.S. PATENT DOCUMENTS

| 2009/0237501 A1 | 9/2009 | Lemmer et al. |
| 2016/0103309 A1 | 4/2016 | Suzuki et al. |

(Continued)

FOREIGN PATENT DOCUMENTS

| WO | WO-2010014244 A2 * | 2/2010 | ......... G02B 21/0048 |
| WO | 2019152670 A1 | 8/2019 | |

OTHER PUBLICATIONS

International Application No. PCT/US2021/044549, International Preliminary Report on Patentability mailed on Feb. 23, 2023, 9 pages.
(Continued)

*Primary Examiner* — Dani Fox
*Assistant Examiner* — Fani Polyzos Boosalis
(74) *Attorney, Agent, or Firm* — Kilpatrick Townsend & Stockton LLP

(57) ABSTRACT

A method of performing imaging includes operating a light sheet projection module in a first state during a first measurement process and using a first primary objective for illumination of a specimen using a light sheet and detection of a first fluorescent emission. The method also includes operating the light sheet projection module in a second state during a second measurement process and using a second primary objective for illumination of the specimen using the light sheet and detection of a second fluorescent emission.

19 Claims, 18 Drawing Sheets

Related U.S. Application Data

(60) Provisional application No. 63/065,304, filed on Aug. 13, 2020.

(51) Int. Cl.
| | |
|---|---|
| *G02B 21/00* | (2006.01) |
| *G02B 26/10* | (2006.01) |
| *H04N 13/282* | (2018.01) |
| *H04N 23/55* | (2023.01) |
| *H04N 23/56* | (2023.01) |
| *H04N 23/74* | (2023.01) |
| *H04N 13/156* | (2018.01) |

(52) U.S. Cl.
CPC ....... *G02B 21/0076* (2013.01); *G02B 26/101* (2013.01); *H04N 13/207* (2018.05); *H04N 13/282* (2018.05); *H04N 23/55* (2023.01); *H04N 23/56* (2023.01); *H04N 23/74* (2023.01); *G01N 2201/0636* (2013.01); *G01N 2201/10* (2013.01); *H04N 13/156* (2018.05)

(58) Field of Classification Search
CPC ...... H04N 13/282; H04N 23/74; H04N 23/56; H04N 23/55; H04N 13/156; G01N 21/6456; G01N 2201/0636; G01N 2201/10
See application file for complete search history.

(56) References Cited

U.S. PATENT DOCUMENTS

| | | | |
|---|---|---|---|
| 2016/0161410 A1* | 6/2016 | Keller | G02B 21/362 435/287.3 |
| 2018/0275389 A1* | 9/2018 | Shepherd | G02B 21/025 |
| 2019/0129153 A1 | 5/2019 | Knebel et al. | |
| 2019/0196172 A1 | 6/2019 | Hillman | |
| 2019/0250388 A1 | 8/2019 | Hillman et al. | |

OTHER PUBLICATIONS

International Application No. PCT/US2021/044549, International Search Report and Written Opinion mailed on Jan. 19, 2022, 12 pages.

International Application No. PCT/US2021/044549, Invitation to Pay Additional Fees and, Where Applicable, Protest Fee mailed on Oct. 6, 2021, 2 pages.

* cited by examiner

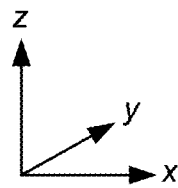
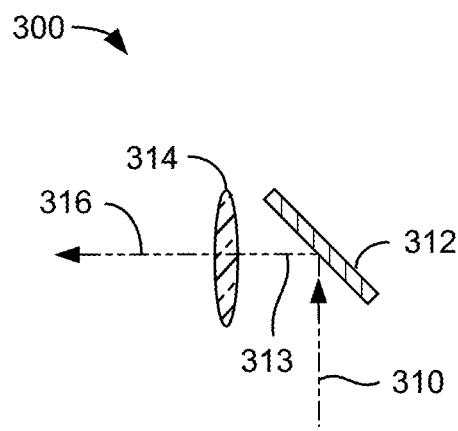
FIG. 3A
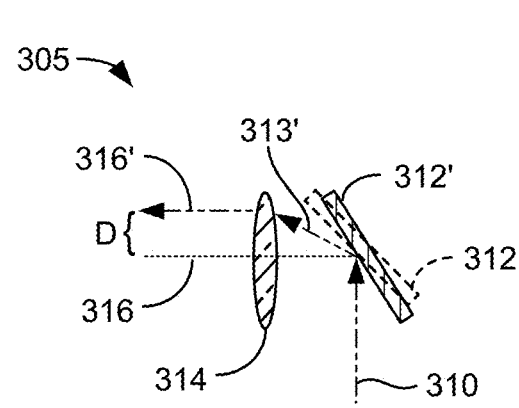
FIG. 3B
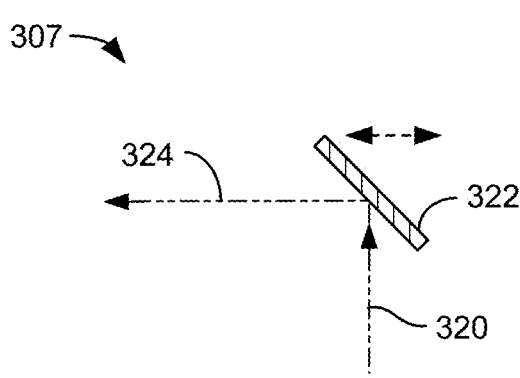
FIG. 3C
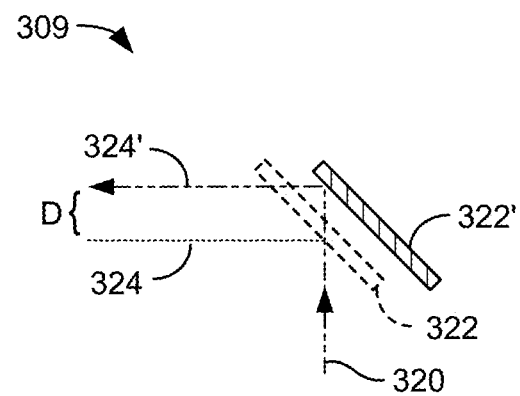
FIG. 3D

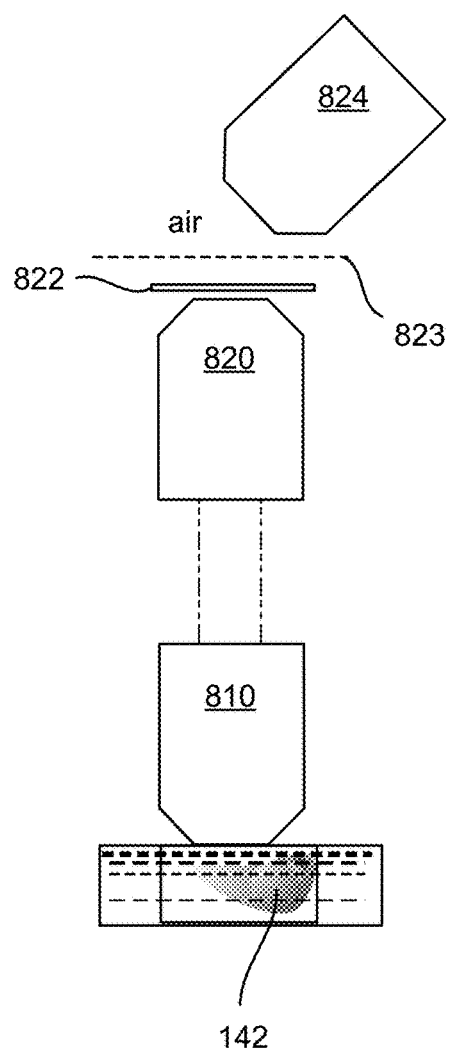
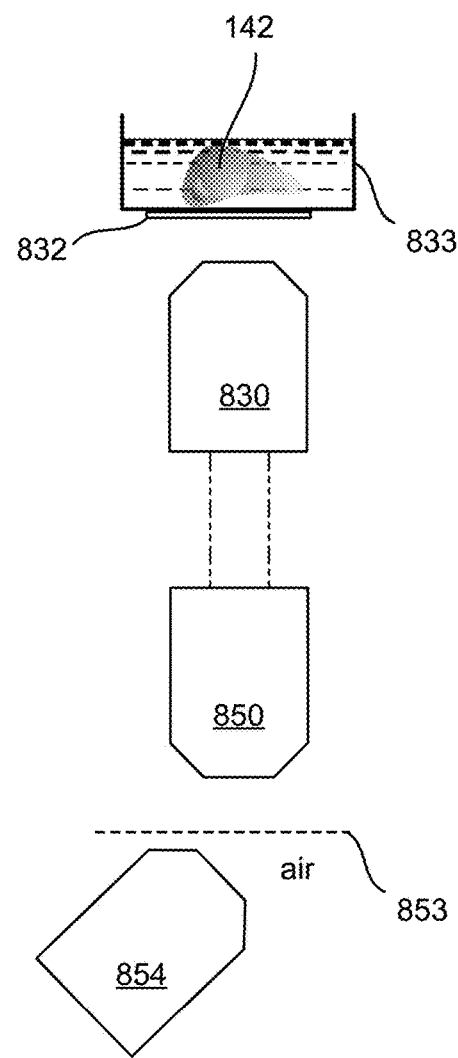
FIG. 8A  FIG. 8B

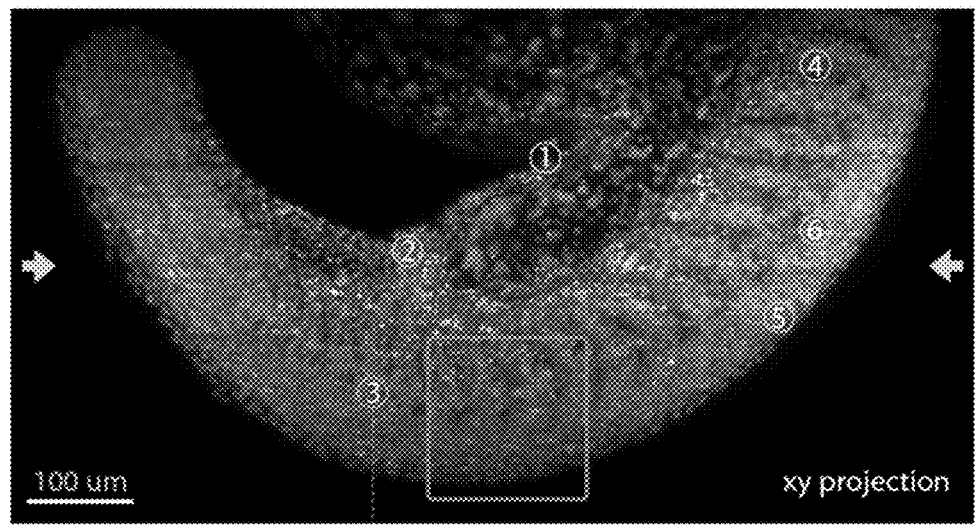
FIG. 12A
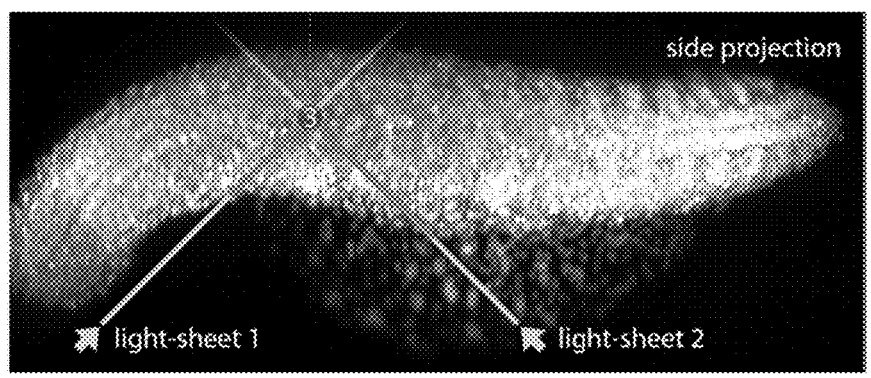
FIG. 12B
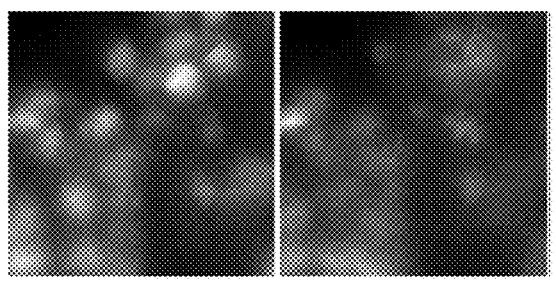 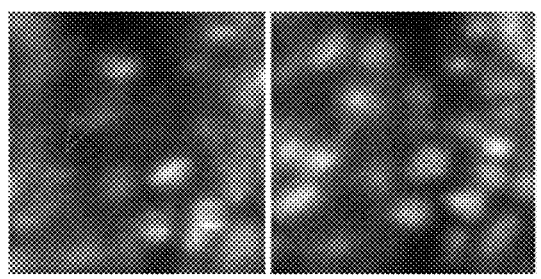
FIG. 12C   FIG. 12D     FIG. 12E   FIG. 12F

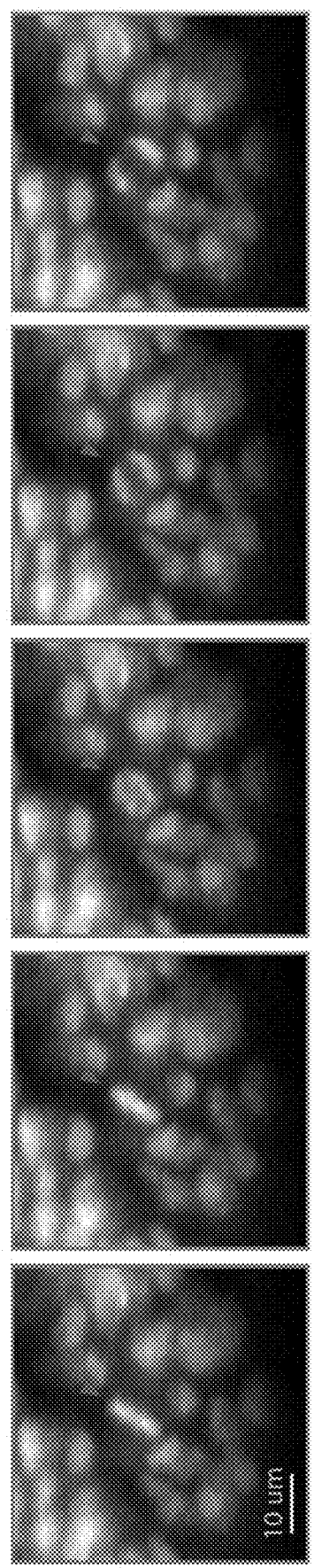

METHOD AND SYSTEM FOR MULTI-VIEW EPISCOPIC SELECTIVE PLANE ILLUMINATION MICROSCOPE

CROSS-REFERENCES TO RELATED APPLICATIONS

This application is a continuation of International Patent Application No. PCT/US2021/044549, filed Aug. 4, 2021, which claims the benefit and priority to U.S. Provisional Patent Application No. 63/065,304, filed on Aug. 13, 2020, the disclosure of which is hereby incorporated by reference in its entirety for all purposes.

BACKGROUND OF THE INVENTION

Selective Plane Illumination Microscopy (SPIM), which can also be referred to as light sheet microscopy, is an imaging technique that has been developed and used for imaging of biological systems. In SPIM, a light sheet is generated and moved throughout the specimen volume during imaging. Conventional SPIM utilizes an illumination objective to generate the light sheet that is projected onto the specimen, and a detection objective that is oriented orthogonally to the illumination objective and the projected light sheet. The lower illumination intensities used in SPIM, in conjunction with scanning of the light sheet, enables reduced photobleaching and phototoxicity during imaging.

Despite the progress made in the use of SPIM for biological imaging applications, there exists a need in the art for improved methods and systems for performing microscopic imaging of biological systems.

SUMMARY OF THE INVENTION

Embodiments of the present invention relate generally to methods and systems for multi-view, episcopic imaging with increased imaging depth and resolution. More particularly, some embodiments provide an episcopic, selective plane illumination microscope that utilizes multiple objectives, each being utilized for both illumination and detection, to perform multi-view imaging, for example, fluorescent imaging. As described herein, the multi-view, episcopic, selective plane illumination microscope is compatible with conventional specimen mounting techniques, enabling a user-friendly microscope that is suitable for widespread adoption.

Embodiments of the present invention enable depth-resolved imaging of microscopic specimens in order to provide volumetric, three-dimensional optical images as well as time-resolved images of the microscopic specimens. Providing high resolution, three-dimensional images, embodiments of the present invention are useful in imaging biological systems at the cellular level. By capturing a sequence of three-dimensional images, embodiments of the present invention are able to image the trajectory of cells, for example, as they divide. Thus, embodiments provide insight into cell development as early as the embryo stage, imaging cells as they divide and form various biological structures during development. Since embodiments of the present invention can capture a volumetric image in time periods on the scale of seconds or tens of seconds, near real-time imaging of cellular development is provided using the methods and systems described herein.

According to an embodiment of the present invention, a selective plane imaging microscope is provided. The selective plane imaging microscope includes an illumination source, an image detector, and a specimen stage operable to support a specimen having a first side and a second side opposing the first side. An optical axis is disposed normal to the specimen. The selective plane imaging microscope also includes an angle adjustment module operable to position a light sheet at a predetermined angle with respect to the optical axis and an orientation control module operable to modify a scan direction of the light sheet. In some embodiments, a light sheet projection module operable to direct the light sheet to impinge on the first side of the specimen during collection of a first set of volumetric images and the second side of the specimen during collection of a second set of volumetric images is utilized.

According to another embodiment of the present invention, a fluorescence imaging system is provided. The fluorescence imaging system includes a fluorescent excitation source optically coupled to illumination optics. The fluorescent excitation source and the illumination optics are operable to provide a light sheet. The fluorescence imaging system also includes a specimen stage operable to support a specimen having a first side and a second side opposing the first side, an excitation path disposed between the illumination optics and the specimen stage, and an angle adjustment module disposed along the excitation path and operable to modify a scan angle of the light sheet. The fluorescence imaging system further includes an orientation control module disposed along the excitation path and operable to modify a scan direction of the light sheet, a first objective disposed on the first side of the specimen, and a second objective disposed on the second side of the specimen. Additionally, the fluorescence imaging system includes a light sheet projection module disposed along the excitation path and operable to either project the light sheet to pass through the first objective and impinge on the first side of the specimen or project the light sheet to pass through the second objective and impinge on the second side of the specimen. The fluorescence imaging system also includes an image detector optically coupled to detection optics.

According to a specific embodiment of the present invention, a method of performing imaging is provided. The method includes scanning a light sheet across a specimen in a first scan direction, forming a first volumetric image of the specimen using a first objective, modifying an orientation of the light sheet using an orientation control module, scanning the light sheet across the specimen in a second scan direction, and forming a second volumetric image of the specimen using the first objective. The method also includes scanning the light sheet across the specimen in a third scan direction, forming a third volumetric image of the specimen using a second objective, modifying the orientation of the light sheet using the orientation control module, scanning the light sheet across the specimen in a fourth scan direction, and forming a fourth volumetric image of the specimen using the second objective. The method further includes fusing the first volumetric image, the second volumetric image, the third volumetric image, and the fourth volumetric image to form a fused image.

In an embodiment, the method also includes using an angle adjustment module to dispose the light sheet at a predetermined angle with respect to an optical axis prior to scanning the light sheet across the specimen in the first scan direction. The optical axis can pass through the first objective and the second objective. The angle adjustment module can be disposed in a first state prior to scanning the light sheet across the specimen in the first scan direction. The angle adjustment module can remain in the first state during scanning of the light sheet across the specimen in the second scan direction, the third scan direction, and the fourth scan direction. An absolute values of a scan angle between the first scan direction and an optical axis and a scan angle between the second scan direction and the optical axis can be equal. The optical axis can pass through the first objective and the second objective. The method can also include modifying a state of a light sheet projection module prior to scanning the light sheet across the specimen in the third scan direction. The first volumetric image, the second volumetric image, the third volumetric image, and the fourth volumetric image can be fluorescent images. In some embodiments, forming the fused image includes fusing the first volumetric image and the second volumetric image to form a first intermediate image, fusing the third volumetric image and the fourth volumetric image to form a second intermediate image, and fusing the first intermediate image and the second intermediate image to form the fused image.

According to another specific embodiment of the present invention, a method of performing imaging is provided. The method includes operating a light sheet projection module in a first state during a first measurement process and using a first primary objective for illumination of a specimen using a light sheet and detection of a first fluorescent emission. The method also includes operating the light sheet projection module in a second state during a second measurement process and using a second primary objective for illumination of the specimen using the light sheet and detection of a second fluorescent emission. In an embodiment, an orientation control module is operated in a first state during the first measurement process and during the second measurement process. The method can also include operating the orientation control module in a second state during a third measurement process and during a fourth measurement process and during the third measurement process, operating the light sheet projection module in the first state and using the first primary objective for illumination of the specimen using the light sheet and detection of a third fluorescent emission. During the fourth measurement process, the method can include operating the light sheet projection module in the second state and using the second primary objective for illumination of the specimen using the light sheet and detection of a fourth fluorescent emission. The light sheet can be scanned in a first direction during the first measurement process and the second measurement process. The light sheet can be scanned in a second direction during the third measurement process and the fourth measurement process. The first direction can be oriented with respect to a first angle to an optical axis, the second direction can be oriented with respect to a second angle to the optical axis, and an absolute value of the first angle can be equal to an absolute value of the second angle. The first primary objective and the second primary objective can be disposed along the optical axis. The light sheet can be positioned at a plurality of imaging positions using a combination of scanning of a specimen stage and descanning of a rotating mirror.

Numerous benefits are achieved by way of the present invention over conventional techniques. For example, embodiments of the present invention provide methods and systems for multi-view imaging that are characterized by improved axial resolution and increased imaging depth, which is useful for the imaging of large specimens. Moreover, embodiments of the present invention are compatible with standard specimen mounting techniques, including multi-well plates, Petri dishes, cover glasses, and microfluidic devices, and can be integrated into existing episcopic microscope stands, including epifluorescence microscope stands. Embodiments of the present invention have widespread applicability including to three-dimensional imaging of fluorescence specimens, including cell cultures, cleared tissues, animal embryos, animal brains, animal organs (e.g., heart, lung, etc.), and the like. Although some embodiments are discussed in terms of fluorescence imaging, the present disclosure is not limited to fluorescence imaging and is applicable to bright field microscopy, quantitative phase measurements, polarization microscopy, interferometric scattering microscopy, and the like.

These and other embodiments of the invention along with many of its advantages and features are described in more detail in conjunction with the text below and attached figures.

BRIEF DESCRIPTION OF THE DRAWINGS

FIG. 3A is a simplified cross-sectional diagram illustrating an angle adjustment module in a first configuration according to an embodiment of the present invention.

FIG. 3B is a simplified cross-sectional diagram illustrating the angle adjustment module shown in FIG. 3A in a second configuration according to an embodiment of the present invention.

FIG. 3C is a simplified cross-sectional diagram illustrating an alternative angle adjustment module in a first configuration according to an embodiment of the present invention.

FIG. 3D is a simplified cross-sectional diagram illustrating the alternative angle adjustment module shown in FIG. 3C in a second configuration according to an embodiment of the present invention.

FIG. 8A is a simplified schematic diagram illustrating use of a water dipping objective as a primary objective according to an embodiment of the present invention.

FIG. 8B is a simplified schematic diagram illustrating use of an immersion objective and a coverslip as a primary objective according to an embodiment of the present invention.

FIG. 12A is a photograph illustrating an x-y projection of a multi-view image of a zebrafish tail.

FIG. 12B is a photograph illustrating a side projection of the zebrafish tail.

FIGS. 12C and 12D are photographs associated with light sheet 1 and light sheet 2, respectively at a first imaging location.

FIGS. 12E and 12F are photographs associated with light sheet 1 and light sheet 2, respectively at a second imaging location.

FIGS. 13A-13E are spatio-temporal images showing cell division according to an embodiment of the present invention.

DETAILED DESCRIPTION OF SPECIFIC EMBODIMENTS

Embodiments of the present invention relate generally to methods and systems for multi-view, episcopic, imaging with increased imaging depth and resolution. More particularly, some embodiments provide an episcopic selective plane illumination microscope that utilizes multiple objectives, each being utilized for both illumination and detection, to perform multi-view imaging, for example, fluorescent imaging. The multi-view, episcopic, selective plane illumination microscope is compatible with conventional specimen mounting techniques, enabling a user-friendly microscope that is suitable for widespread adoption.

Selective Plane Illumination Microscopy (SPIM) achieves high spatial-temporal resolution in three-dimensional imaging while being minimally invasive. As will be evident to one of skill in the art, biological specimens can be opaque. As a result, it is desirable to image such specimens from different perspectives or angles, enabling imaging of different portions of the opaque specimen. Accordingly, embodiments of the present invention enable multi-view imaging of specimens, including biological specimens such as embryos and brain tissues, at different angles using a single objective for both illumination and detection.

SPIM has been widely adopted in the field of developmental biology, cell biology, neuroscience, and anatomical science. However, in conventional SPIM systems using a first objective for illumination and a second objective for fluorescence detection, the orthogonality of the illumination and fluorescence detection paths results in the use of two objectives oriented orthogonally with respect to each other. As a result, this orthogonality poses challenges for specimen mounting since a limited space is available at the junction of the objectives.

Embodiments of the present invention provide a selective plane illumination microscope that utilizes a single objective for both illumination and detection. Additionally, embodiments of the present invention implement a multi-view imaging architecture providing improved axial resolution and/or increased imaging depth in comparison to conventional systems. Thus, embodiments of the present invention, which can be referred to as multi-view, episcopic, Selective Plane Illumination Microscope (meSPIM), combine the advantages of a single objective SPIM system, using the same objective for illumination and detection, while also providing the capability of imaging the specimen from multiple views. In other words, embodiments of the present invention can be referred to as both episcopic, i.e., using a single objective for both illumination and detection, and multi-view, i.e., using a set of objectives to provide two illumination and detection paths, thereby performing imaging from multiple (e.g., both) sides of a specimen.

Figure 1A:
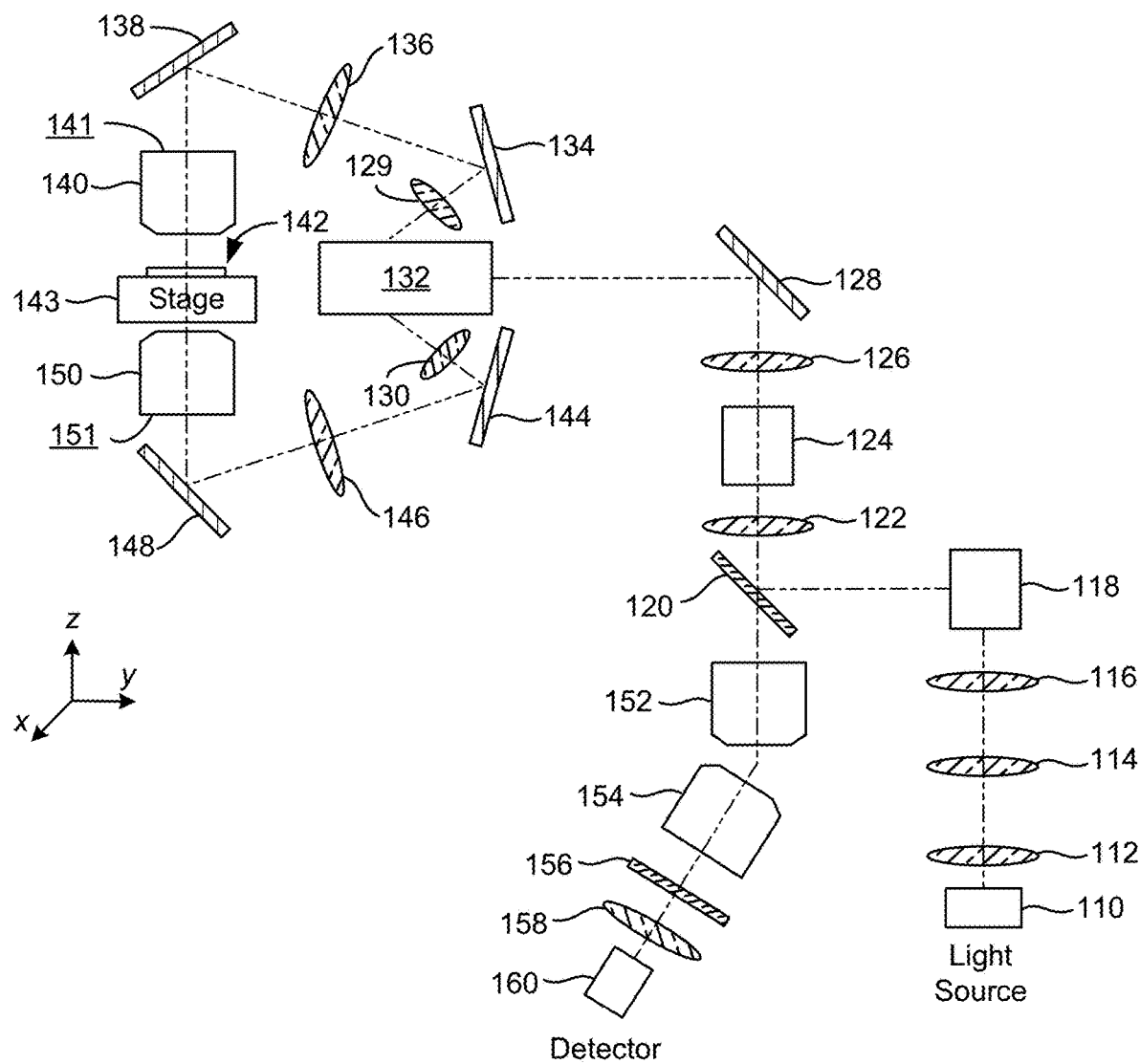
FIG. 1A is a simplified schematic diagram illustrating a multi-view, episcopic, selective-plane illumination microscope according to an embodiment of the present invention.

FIG. 1A is a simplified schematic diagram illustrating a multi-view, episcopic, selective-plane illumination microscope according to an embodiment of the present invention. Light for imaging, for example, fluorescent excitation light, is provided by light source 110. In some embodiments, light source 110 is a multi-wavelength laser source that provides a plurality of predetermined excitation wavelengths, for instance, under computer control. In a particular embodiment, light source 110 is a multi-wavelength laser source that provides fluorescent excitation light at wavelengths of 405 nm, 488 nm, 561 nm, and 637 nm, which are suitable for use with fluorescent markers DAPI, GFP, mCherry, and Cy5, respectively. Accordingly, in some implementations, sequential application of fluorescent excitation light can be used to obtain images based on fluorescent emission from particular fluorescent markers. In some embodiments, non-laser sources, for example, light emitting diodes, lamps, or the like can be utilized.

The transverse profile of light emitted by light source 110 is expanded along the y-axis by cylindrical lenses 112 and 114 and focused by cylindrical lens 116 to provide a light sheet that is incident on angle adjustment module 118. Accordingly, a light sheet is produced at a plane that is conjugated to the pupil plane, which can also be referred to as the back focal plane, of objectives 140 and 150. Additional description related to angle adjustment module 118 is provided in relation to FIGS. 3A-3D.

It should be noted that in addition to the use of cylindrical lenses 112, 114, and 116 to form a light sheet, embodiments of the present invention can utilize other light sheet generation techniques, including formation of an optical lattice light sheet, digital scanning of a Gaussian beam, a Bessel beam, an Airy beam, i.e., digitally scanned laser light sheet microscopy (DSLM), or the like. Additionally, one or more diffractive optical elements can be used in the light sheet generation process. Thus, various scanning and other optical approaches to generate the light sheet can be utilized within the scope of the present invention since the methods and systems for performing single-objective, multi-view imaging described herein are independent of the particular method of light sheet generation.

Angle adjustment module 118 is used to control the position at which the light sheet impinges on dichroic mirror 120. As a result, angle adjustment module 118 controls the scan angle at which the light sheet is disposed with respect to the optical axis passing through the specimen (i.e., the z-axis). The pupil plane of secondary objective 152 is conjugated with surface 141 of objective 140 and surface 151 of objective 150. In this implementation, the dichroic mirror is in the infinite space between secondary objective 152 and lens 122. Accordingly, when light is parallel to the optical axis, shifting the light at the surface of dichroic mirror 120 is equivalent to shifting the light at surface 141 of objective 140 and surface 151 of objective 150. Surfaces 141 and 151 can be referred to as the pupil plane (i.e., the back focal plane) of the corresponding objective. Thus, as the light sheet is shifted in the z-direction at dichroic mirror 120, the light sheet is shifted along the y-axis at the pupil plane of the objectives (i.e., a lateral shift at the back focal plane of the objective), resulting in a change of angle in the specimen plane.

The adjustment of the incident angle of the light sheet (i.e., adjustment of the scan angle) is utilized by embodiments of the present invention to enable imaging of specimens when the refractive index of the specimen is different from the imaging medium. This may result in refraction of the light sheet in the specimen, thereby causing part of the illuminated plane to become out of focus at the camera. By adjusting the incident angle, embodiments of the present invention bring the illuminated plane back in focus, increasing the signal-to-noise ratio and improving the image quality. As described more fully in relation to FIGS. 3A-3D, two methods of adjusting the light sheet incident angle can be utilized, including use of a rotating mirror or a mirror on a translatable stage.

Referring once again to FIG. 1A, excitation light is reflected from dichroic mirror 120 toward specimen 142, passes through lens 122, and impinges on orientation control module 124. As described more fully in relation to FIGS. 4A-4D, orientation control module 124 is used to establish the scan direction of the light sheet with respect to the specimen.

After the light sheet transits orientation control module 124, it passes through lens 126, is reflected by rotating mirror 128 and is incident on light sheet projection module 132. Light sheet projection module 132 enables the light sheet to be incident from either side of specimen 142. In one measurement process, light sheet projection module 132 directs light through lens 129 to mirror 134, lens 136, mirror 138, and objective 140 in order to image specimen 142 from a direction originating along the positive z-axis. Alternatively, in another measurement process, light sheet projection module 132 directs light through lens 130 to mirror 144, lens 146, mirror 148, and objective 150 in order to image specimen 142 from a direction originating along the negative z-axis. Additional description related to light sheet projection module 132 is provided in relation to FIGS. 5A-5D. In some embodiments, light sheet projection module 132 is optional and imaging and detection from a single side of the specimen 142 can be performed. When light sheet projection module 132 is not utilized, lens 130, mirror 144, lens 146, mirror 148, and objective 150 or lens 129, mirror 134, lens 136, mirror 138, and objective 140 can be removed from the optical system as appropriate. Thus, although light sheet projection module 132 is illustrated in FIG. 1A, light sheet projection module 132 is not required. One of ordinary skill in the art would recognize many variations, modifications, and alternatives.

Although the embodiment illustrated in FIG. 1A utilizes light sheet projection module 132 in a system with shared illumination and detection arms, thereby utilizing a single detector and light sheet generation module to obtain views of the specimen from different perspectives, other embodiments of the present invention can "unfold" the optical system to increase imaging speed. Therefore, in some embodiments, multiplexing techniques, for example, either wavelength multiplexing, beam scanning, or the like, can be utilized in conjunction with additional optics to increase the image acquisition speed. As an example, a first illumination/detection arm incorporating elements from light source 110 through angle adjustment module 118 and from secondary objective 152 through detector 160 and associated with objective 140 can be utilized to perform illumination/detection from a first side of specimen 142. A second illumination/detection arm incorporating elements matching the first illumination/detection arm (110-118 and 152-160) and associated with objective 150 can be utilized to perform illumination/detection from a second side of specimen 142. Thus, independent illumination/detection arms each associated with one of the objectives can be utilized to increase image acquisition speed.

Figure 2A:
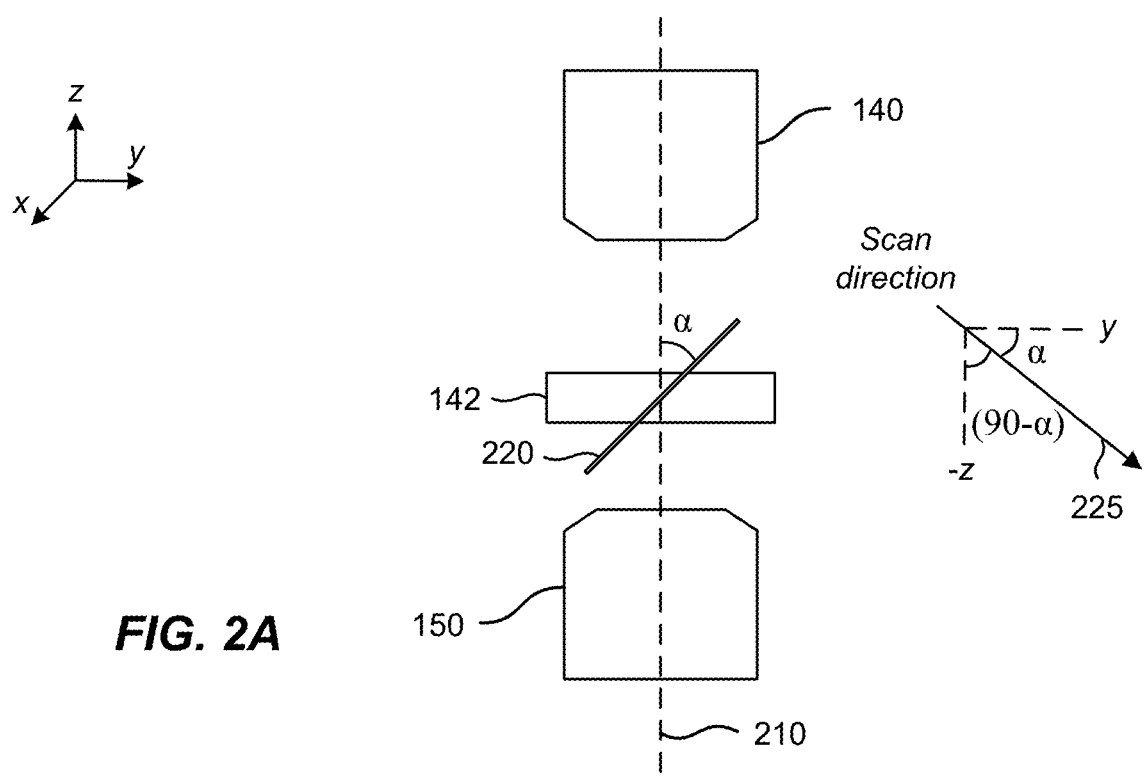
FIG. 2A is a simplified cross-sectional diagram illustrating a first imaging geometry according to an embodiment of the present invention.
Figure 2B:
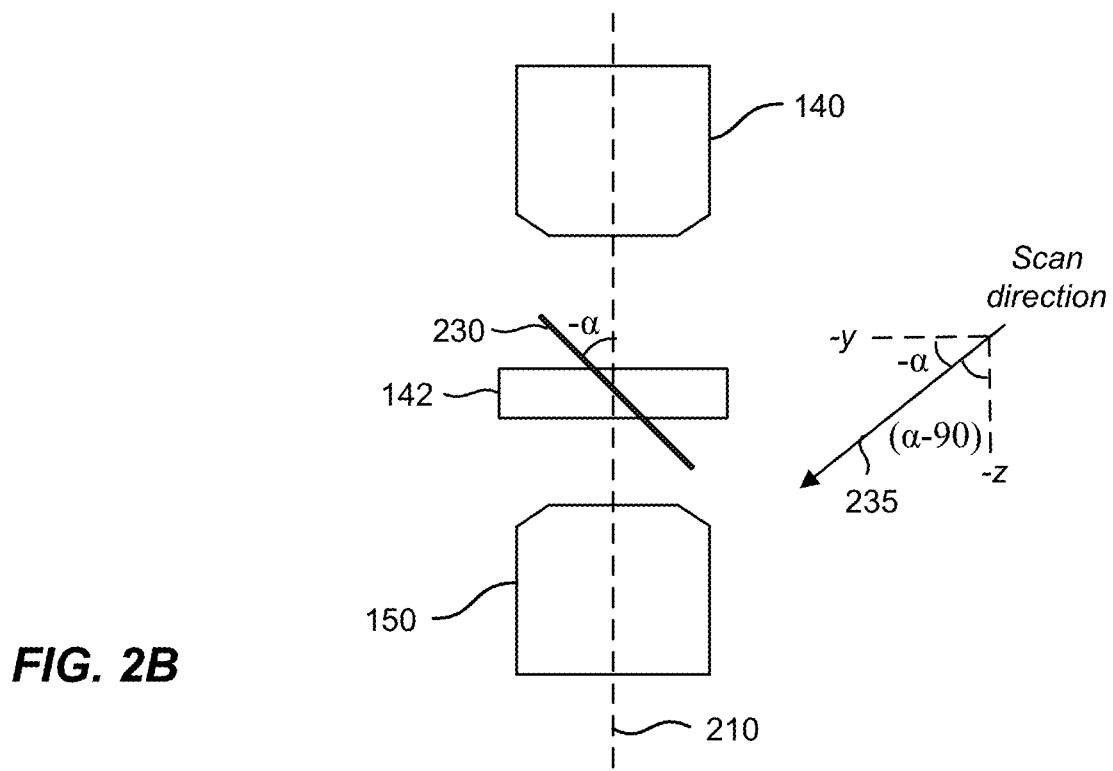
FIG. 2B is a simplified cross-sectional diagram illustrating a second imaging geometry according to an embodiment of the present invention.

Additionally, in addition to obtaining views of the specimen from different perspectives using different optical arrangements, modifications to orientation control module 124 can be implemented that enable imaging of the specimen at multiple scan angles using multiplexing or concurrent imaging techniques. As an example, light received from lens 122 could be split, for example, using a beam splitter integrated into orientation control module 124, to provide a first light sheet oriented, as illustrated in FIG. 2A, at a scan angle α with respect to optical axis 210 (i.e., the z-axis), and a second light sheet oriented, as illustrated in FIG. 2B, at a scan angle −α with respect to optical axis 210. Thus, in contrast with other embodiments that provide a single light sheet as an output, other embodiments can utilize an orientation control module that receives a single input and provides two or more light sheets as an output, enabling concurrent illumination at multiple scan angles using a single objective. The optical paths of the multiple light sheets, in both the illumination and detection paths, can operate in parallel to improve imaging acquisition speed. In some embodiments, the multiple output light sheets are output as collinear beams from the orientation control module, whereas in other embodiments, the multiple output light sheets are output and propagate to light sheet projection module 132 along separate optical paths.

As an example, in embodiments that split the input light sheet into two output light sheets, half of the illumination light can be oriented at a first scan angle and the other half of the illumination light can be oriented at a second scan angle. The output light sheets can be provided either concurrently using multiple optical paths (i.e., spatial multiplexing) or a single optical path (i.e., time division multiplexing). In a spatially multiplexed system, the output light sheets will utilize multiple illumination/detection paths to provide concurrent illumination/detection at multiple orientations. In a time division multiplexed system, a first output light sheet oriented at a first scan angle could be used to illuminate the specimen, with a first camera acquiring images with frames aligned with a first time. A second camera could then be used to acquire images using a second output light sheet oriented at a second scan angle with frames that are time shifted and aligned with a second time. Accordingly, multi-orientation imaging can be performed concurrently or in a multiplexed mode using a single objective and multi-orientation and multi-view imaging can be performed using multiple objectives.

The light sheet, under the control of angle adjustment module 118, orientation control module 124, and light sheet projection module 132, impinges on the pupil plane, i.e., the back focal plane, of one of the primary objectives (i.e., objective 140 or objective 150) off-center from the optical axis, thereby generating an oblique plane illumination in the specimen.

Specimen 142 is mounted on specimen stage 143, which can be a multi-axis translation stage operable to translate in three-directions. In some embodiments, rather than translating and/or rotating specimen stage 143, rotating mirror 128 is utilized to scan the light sheet with respect to the specimen. Rotating mirror 128 is conjugated to the pupil plane (i.e., the back focal plane) of objective 140 and 150. Rotation of rotating mirror 128 thus results in a change in angle of the light sheet at the pupil plane. This change in angle of the light sheet at the pupil plane produces a lateral movement of the oblique light sheet at the specimen, i.e., motion of the light sheet along the y-axis. Thus, scanning of the light sheet with respect to specimen 142 can be implemented using rotating mirror 128.

In one exemplary embodiment, in order to implement imaging plane scanning, rotating mirror 128 is implemented using a galvanometer mirror (i.e., 20 mm galvo 6SD12205 available from Cambridge Technology of Bedford, MA) that was conjugated to the pupil planes of both objectives 140 and 150. Rotation of the galvanometer mirror scans the oblique light sheet across the specimen 142 with the incident angle kept at 45°. The galvanometer mirror also descans the intermediate image at the focal space of secondary objective 152 so that the intermediate image was always projected at the focal plane of tertiary objective 154. Using a galvanometer for rotating mirror 128 to implement image scanning allows faster imaging speed compared to stage scanning.

In yet other embodiments, a combination of motion of specimen stage 143 and rotation of rotating mirror 128 prevents blurring of the image as a result of motion of specimen stage 143 during imaging. As described more fully below, this approach enables imaging in a mode in which the specimen position is fixed with respect to the light sheet for the exposure time during which each image is captured. Accordingly, an image is acquired, the position of the light sheet is moved to a new position in the specimen, another image is acquired, etc.

Figure 1B:
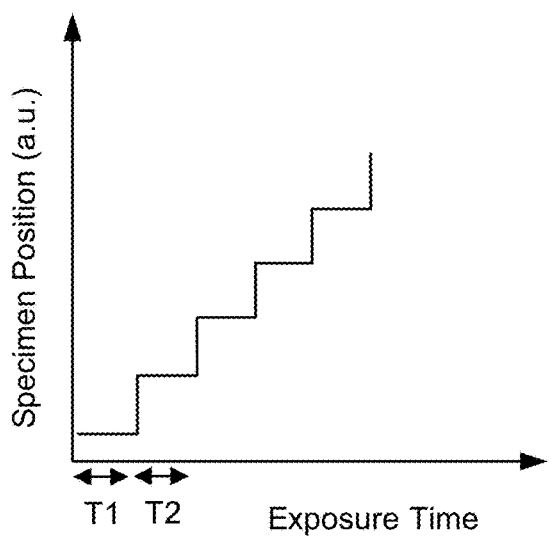
FIG. 1B is a plot illustrating the position of the specimen with respect to the light sheet using scanning of a rotating mirror according to an embodiment of the present invention.
Figure 1C:
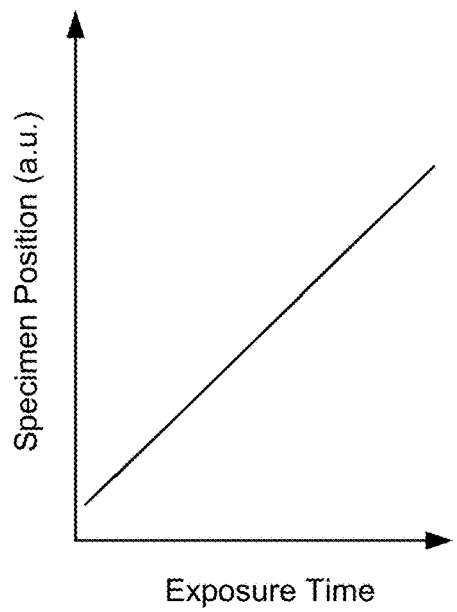
FIG. 1C is a is a plot illustrating the position of the specimen with respect to the light sheet using scanning of a specimen stage according to an embodiment of the present invention.
Figure 1D:
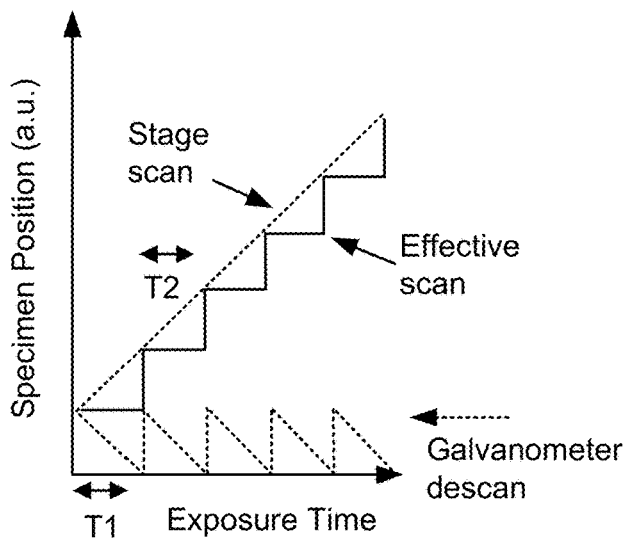
FIG. 1D is a plot illustrating the position of the specimen with respect to the light sheet using combined scanning of the rotating mirror and the specimen stage according to an embodiment of the present invention.

FIG. 1B is a plot illustrating the position of the specimen with respect to the light sheet using scanning of a rotating mirror according to an embodiment of the present invention. FIG. 1C is a is a plot illustrating the position of the specimen with respect to the light sheet using scanning of a specimen stage according to an embodiment of the present invention. FIG. 1D is a plot illustrating the position of the specimen with respect to the light sheet using combined scanning of the rotating mirror and the specimen stage according to an embodiment of the present invention.

Referring to FIG. 1B, imaging of the specimen using rotating mirror 128, also referred to as a galvanometer mirror, is illustrated. Because a galvanometer mirror can scan from one position to another rapidly, the position of the specimen with respect to the light sheet can be changed quickly, resulting in a substantially vertical line connecting the illustrated imaging positions. As illustrated in FIGS. 1A and 1B, as rotating mirror 128 shifts from one angle to another, a series of images (e.g., five images in this illustration) can be acquired at fixed positions of the specimen with respect to the light sheet, which can be referred to as imaging positions.

In contrast with rotating mirror 128, specimen stage 143 is characterized by much slower motion and typically operates in a continuous manner to provide accurate positioning. Referring to FIGS. 1A and 1C, specimen stage 143 is moved or translated continuously from a first position at the beginning of the exposure time to a second position at the end of the exposure time illustrated in the plot. As images are acquired, for example, the five images illustrated in FIG. 1B, the specimen stage is moving and, as a result, the position of the specimen relative to the light sheet is moving. As a result, image blur can result using the approach illustrated in FIG. 1C.

To compensate for motion of specimen stage 143 during imaging, rotating mirror 128 can be used to "descan" specimen 142, preserving the specimen in a fixed position with respect to the light sheet during imaging. As illustrated in FIG. 1D, a first image is acquired during time period T1, also referred to as a frame time. During this time period, the specimen stage is scanned in combination with scanning of the rotating mirror. In operation of this motion compensated system, rotating mirror 128 is backscanned, also referred to as descanned, at a velocity that matches and cancels the motion of the specimen stage such that the light sheet is maintained in a fixed position with respect to the specimen during imaging. As illustrated in FIG. 1D, during a time period T1, which is associated with capturing of the first image, a controller is utilized to cause rotating mirror 128 to backscan the light sheet to stabilize the image on detector 160. As a result, no blurring of the image occurs as a result of motion of the specimen stage.

Referring to FIG. 1D, during each image capture time period, the specimen stage is used to move the specimen in a first direction with respect to the light sheet while the rotation of the mirror is used to move the light sheet in an equal and opposite direction with respect to the specimen. As a result, the image plane is static relative to the specimen as the combined motion of the specimen stage and rotating mirror cancel each other. Thus, the slope of the curve associated with the position of the specimen with respect to the light sheet as a function of time that results from scanning of the specimen stage (Stage scan in FIG. 1D) is equal and opposite to the slope of the curve associated with the position of the specimen with respect to the light sheet as a function of time that results from scanning of the rotating mirror (Galvanometer descan in FIG. 1D). As shown in FIG. 1D, this combined motion and the equal and opposite slopes produces a static condition during imaging for the five illustrated images (Effective scan in FIG. 1D).

Once the time period T1 has elapsed and the first image has been acquired, rotating mirror 128 is reset to a default position from which it can be rotated to backscan the light sheet during a subsequent time period T2. Similar descanning is performed during subsequent time periods as the specimen stage is scanned continuously. Accordingly, embodiments of the present invention can utilize backscanning techniques to obtain images with improved signal to noise ratio and other quality metrics in comparison to an image captured while the light sheet is moving with respect to the specimen.

Thus, as illustrated in FIGS. 1B-1D, a method of implementing light sheet microscopy is provided in which a large imaging volume is achieved by utilizing a large field of view along with a long scanning range as the sample is imaged one plane at a time. Thus, according to various embodiments of the present invention, volumetric scanning using an episcopic, for example, a single objective, light sheet microscope is performed by either moving the imaging plane (i.e., both the illumination and detection plane) or the sample relative to the other. Moving the imaging plane can be faster in some implementations because it can be implemented with a fast actuator such as a galvanometer scanner, also referred to as a galvo scanner.

In some implementations, the volumetric scanning range can be limited by the field of view of the primary objective. Moving the sample relative to the imaging plane using a microscope stage is not impacted by this limitation and can offer a scanning range of more than 10 mm. Therefore, some embodiments utilize stage scanning, either by stepwise motions to avoid motion blur, which may limit temporal resolution, or by strobing the illumination light, which can reduce motion blur, for example, at the cost of increased peak illumination intensity.

Because, due to microscope's scan geometry, stage scanning may introduce both axial and lateral blur, impacting the lateral resolution, which is typically better than the axial resolution and hence more sensitive to blur. Accordingly, embodiments of the present invention utilize designs that combine the high speed of a galvanometer scanner and the large scan range of a microscope stage. As illustrated in FIG. 1D, the stage moves continuously while a compensatory motion of the imaging plane induced by a galvanometer scanner cancels out any relative motion between the sample and the imaging plane during the exposure of one camera frame. The imaging plane is then brought back to the starting position during the camera readout and before a new frame is acquired. All advantages of stage scanning are retained, while simultaneously benefiting from the advantages of high-speed galvanometer-based scanning. In light of the typical exposures and travel speeds needed in practice, the only true limiting factors of the scanning speed are camera speed and fluorophore brightness.

Using the approach illustrated in FIG. 1D, benefits provided by the approaches illustrated in FIGS. 1B and 1C can be obtained while improving on these approaches. For example, by scanning the specimen stage in combination with scanning of the rotating mirror, a large field of view can be obtained as a result of the long scan range (e.g., several millimeters) provided by scanning of the specimen stage, which can be compared to several hundred microns for galvanometer scanning. Also, the consistent image quality across the field of view, which is associated with scanning of the specimen stage, can be obtained using the approach illustrated in FIG. 1D.

In other embodiments, a six degree of freedom specimen stage is provided that can translate in three dimensions and rotate in three dimensions (pitch, yaw, and roll). Thus, embodiments of the present invention can scan the light sheet with respect to the specimen by scanning the specimen stage and/or the objective and/or the rotating mirror. As an example, the objective can be used to scan the light sheet along the z-axis while the specimen stage or the rotating mirror are used to scan the specimen or light sheet along the y-axis, resulting in scanning of the light sheet along the scan directions illustrated in FIGS. 2A and 2B. In another example, scanning using on the rotating mirror is implemented, resulting in scanning of the light sheet along the y-axis. In yet another example, scanning only the objective is implemented, resulting in scanning of the light sheet along the z-axis. Thus, as described more fully herein, volumetric images are formed by illumination of the specimen using light sheets oriented in multiple planes, with the light sheet defining illumination/detection planes positioned at multiple positions with respect to the specimen. These multiple positions can be achieved by any combination of scanning of the light sheets using scanning of the rotating mirror, scanning of the objectives, and/or motion of the specimen with respect to the light sheets using the specimen stage. One of ordinary skill in the art would recognize many variations, modifications, and alternatives.

Fluorescent emission from specimen 142 is collected by objective 140 or objective 150, depending on the optical path determined by the state of light sheet projection module 132. Propagating along the corresponding optical path, emitted light returns through light sheet projection module 132 and orientation control module 124, passing through dichroic mirror 120. Embodiments of the present invention utilize a remote focusing module that includes two objectives (i.e., secondary objective 152 and tertiary objective 154). This remote focusing module ensures that the obliquely illuminated plane in the specimen can be imaged at detector 160 in-focus. Thus, as illustrated in FIG. 1A, the detection path includes secondary objective 152, tertiary objective 154, emission filter 156, and lens 158 in conjunction with detector 160, which records the image, for example, a fluorescent image.

In an embodiment, tertiary objective 154 is designed to have a high numerical aperture (NA), for example, at least NA=1.0, an adequate field of view, and reasonable mechanical dimensions to avoid collision with the secondary objective 152. In order to extend the field of view for low magnification systems (e.g., 20×), an embodiment utilizes a custom tertiary objective 154 with NA=1.0 and a field of view up to 750 µm. In this embodiment, tertiary objective 154 features an air-glass imaging boundary and a zero working distance for maximum mechanical clearance and hemispherical collection in air, thus enabling embodiments of the present invention to achieve uncompromised high resolution with a large field of view.

Embodiments of the present invention utilize several techniques to form a volumetric image (i.e., a 3D image). In one embodiment, the light sheet is scanned with respect to the specimen using rotating mirror 128 as discussed above. In another embodiment, the specimen is moved with respect to the light sheet by motion of specimen stage 143. Moreover, in some embodiments as described above, backscanning or descanning of the light sheet during image capture is utilized to reduce blurring. This scanning of the light sheet/specimen along the appropriate scan direction is illustrated in FIGS. 2A and 2B.

FIG. 2A is a simplified cross-sectional diagram illustrating a first imaging geometry according to an embodiment of the present invention. In FIG. 2A, objectives 140 and 150 are illustrated as disposed along an optical axis in a vertical orientation, with both objectives positioned at predetermined distances along the z-axis, which is aligned with optical axis 210 passing through the objectives. Thus, objective 140 points down towards specimen 142 and objective 150 points up towards specimen 142. For the purposes of clarity, specimen stage 143 has been removed in the illustration provided in FIG. 2A. As illustrated in FIG. 1A, specimen 142 is mounted on specimen stage 143 such that specimen 142 is generally disposed in the x-y plane, i.e., horizontal with respect to optical axis 210, which is oriented vertically.

As will be evident to one of skill in the art, the specimen mounting configuration illustrated in FIG. 2A is compatible with conventional specimen mounting modalities, including multi-well plate, petri dish, cover glass, and microfluidics device. Accordingly, embodiments of the present invention are compatible with conventional specimen mounting techniques, enabling a user-friendly microscope that is suitable for widespread adoption. Although the discussion herein is provided in relation to a specimen stage having a single specimen, embodiments of the present invention are not limited to this particular form factor and, for example, if specimens are disposed in wells of a multi-well plate, the specimens can be imaged sequentially by merely translating the multi-well plate after the specimens are imaged sequentially. As a result, the throughput of the methods and systems described herein is increased significantly with respect to conventional techniques.

Although a vertical arrangement of objectives 140 and 150 is illustrated in FIG. 1A and FIG. 2A, it will be appreciated that objectives 140 and 150 could be oriented in a horizontal configuration with, for example, objective 140 disposed along the positive y-axis and objective 150 disposed along the negative y-axis. Similarly, objective 140 could be disposed along the positive x-axis and objective 150 disposed along the negative x-axis. Thus, the vertical arrangement utilizing an optical axis aligned with the z-axis is not required by the present invention and other orientations can be utilized within the scope of the present invention. One of ordinary skill in the art would recognize many variations, modifications, and alternatives.

Referring once again to FIG. 2A, light sheet 220, which is disposed perpendicular to the y-z plane, is oriented at a scan angle α with respect to optical axis 210 (i.e., the z-axis). During scanning of light sheet 220 through specimen 142, light sheet 220 is scanned along scan direction 225, which includes a component aligned with the y-axis, which is oriented at angle (90-α) with respect to optical axis 210. Alternatively, scan direction 225, which lies in the y-z plane, can be referenced to the y-axis as being oriented at an angle α to the y-axis. During a measurement process using objective 150, light sheet 220 is positioned at a predetermined scan angle (e.g., scan angle α) using angle adjustment module 118 and the specimen is scanned along scan direction 225 to perform volumetric imaging.

FIG. 2B is a simplified cross-sectional diagram illustrating a second imaging geometry according to an embodiment of the present invention. As illustrated in FIG. 2B, light sheet 230 is disposed perpendicular to the y-z plane and oriented at a scan angle −α with respect to optical axis 210, i.e., the z-axis. The modification of the scan angle from α to −α can be implemented using orientation control module 124 illustrated in FIG. 1A.

During scanning of light sheet 230 through specimen 142, light sheet 230 is scanned along scan direction 235, which is oriented at angle (90-α) with respect to the z-axis. Alternatively, scan direction 235, which includes a component aligned with the y-axis and lies in the y-z plane, can be referenced to the y-axis as being oriented at an angle −α to the y-axis. Thus, during a second measurement process using objective 150, light sheet 230 is positioned at a predetermined scan angle (e.g., scan angle −α) using angle adjustment module 118 and orientation control module 124 and the specimen is scanned along scan direction 235 to perform volumetric imaging.

According to embodiments of the present invention, imaging of specimens from multiple views is provided. For purposes of clarity, the different views utilized during imaging can be classified into two classes: multi-orientation and multi-view. Multi-orientation refers to the multiple views that can be imaged using a single objective. Multi-view refers to the multiple views that can be imaged using multiple objectives.

Referring to FIGS. 2A and 2B, multi-orientation imaging is provided with a first image obtained using light sheet 220 oriented at a scan angle α with respect to the z-axis and scanning in a first direction and a second image obtained using light sheet 230 oriented at a scan angle −α with respect to the z-axis and scanning in a second direction. This multi-orientation imaging can be performed using either objective 140 or objective 150.

As will be discussed in additional detail in relation to FIGS. 6A-6G, imaging from four views (i.e., multi-view imaging) is enabled by using both objective 140 and 150, with each objective being utilized to performing multi-orientation imaging as illustrated in FIGS. 2A and 2B. Of course, as will be evident to one of skill in the art, embodiments of the present invention are not limited to four predetermined views since the scan angle can be controlled using angle adjustment module 118, which can provide, for example, predetermined scan angles over a range of $0° \leq \alpha \leq 70°$. It should be noted that multi-view imaging can be performed independently of multi-orientation imaging, with, for example, light sheet 220 oriented at a scan angle α with respect to the z-axis used to image the specimen through objective 140 and then light sheet 220 used to image the specimen through objective 150. One of ordinary skill in the art would recognize many variations, modifications, and alternatives.

By utilizing both orientation control module 124 and light sheet projection module 132, embodiments of the present invention can acquire 3D images of the specimen from two different views using each objective, resulting in a total of four datasets from four different views. As described in relation to FIGS. 6A-6C and 6D-6E, the datasets from the same primary objective can be further processed to produce a single dataset with better axial resolution, signal to noise ratio, signal to background ratio, and contrast. Moreover, by processing the views from the two primary objectives as illustrated in FIG. 6G, embodiments of the present invention effectively double the imaging depth.

FIG. 3A is a simplified cross-sectional diagram illustrating an angle adjustment module 300 in a first configuration according to an embodiment of the present invention. As illustrated in FIGS. 3A and 3B and FIGS. 3C and 3D, respectively, embodiments of the present invention utilize an angle adjustment module to control the incident angle of the light sheet, which can also be referred to the scan angle, during volumetric imaging. Various implementations of optical systems can be utilized to provide for adjustment and fine-tuning of the scan angle and the example systems illustrated in FIGS. 3A-3D are merely exemplary.

Referring to FIG. 3A, a first apparatus for implementing angle adjustment module 118 is illustrated. In this apparatus, a rotating mirror is utilized to provide for angle adjustment. Incoming light from the light source is represented by input light sheet 310. Rotating mirror 312 receives input light sheet 310 and reflects the light to form reflected light sheet 313, which impinges on lens 314. As reflected light sheet 313 passes through lens 314, output light sheet 316 is generated. In the embodiment illustrated in FIG. 3A, rotating mirror 312 is oriented at a default position, resulting in the position of output light sheet 316 being located at a default position.

FIG. 3B is a simplified cross-sectional diagram illustrating the angle adjustment module shown in FIG. 3A in a second configuration according to an embodiment of the present invention. As shown in FIG. 3B, during operation of angle adjustment module 305, rotating mirror 312' is illustrated as having rotated clockwise, resulting in reflected light sheet 313' being reflected at an angle with respect to the direction of propagation of reflected light sheet 313. Accordingly, as reflected light sheet 313' impinges on lens 314, output light sheet 316' is translated by distance D from the default position represented by output light sheet 316.

In the embodiment illustrated in FIGS. 3A and 3B, rotating mirror 312/312' is placed at the focal plane of lens 314 illustrated in FIG. 3B and is conjugated with the specimen plane lying in the x-y plane as illustrated in FIG. 1A. Accordingly, the rotation of rotating mirror 312/312' results in a change of the incident angle of the light sheet at the specimen, thereby providing a controllable scan angle. In some implementations, the default position of rotating mirror 312 as illustrated in FIG. 3A corresponds to the light sheet being aligned with the y-z plane, i.e., a scan angle α=0°. Referring to FIG. 3B, as rotating mirror 312' rotates clockwise with respect to the default position shown in FIG. 3A, the light sheet at the specimen plane rotates to a positive scan angle, which can be controlled to achieve, for example, predetermined scan angles over a range of 0°≤α≤70°.

As an alternative to a rotating mirror, a mirror mounted on a translation stage can be utilized to provide for angle adjustment of the light sheet at the specimen plane. FIG. 3C is a simplified cross-sectional diagram illustrating an alternative angle adjustment module 307 in a first configuration according to an embodiment of the present invention. FIG. 3D is a simplified cross-sectional diagram illustrating the alternative angle adjustment module shown in FIG. 3C in a second configuration according to an embodiment of the present invention.

Referring to FIG. 3C, translating mirror 322 receives input light sheet 320 and reflects the light to form reflected light sheet 324. In the embodiment illustrated in FIG. 3C, translating mirror 322 is oriented at a default position, resulting in the position of output light sheet 324 being located at a default position. Referring to FIG. 3D, during operation of angle adjustment module 309, translating mirror 322' has been translated to the right using a translation stage (not shown). As a result of the translation of translating mirror 322', displacement of the light sheet in the vertical direction is produced, illustrated by displacement of output light sheet 324' by distance D from the default position represented by output light sheet 324. In a manner similar to that discussed in relation to FIGS. 3A and 3B, because translating mirror 322/322' is placed between the infinite space of lens 122 and cylindrical lens 116, displacement of the light sheet at the pupil plane (i.e., the back focal plane) of objectives 140 and 150 results in a change of the incident angle (i.e., the scan angle) of the light sheet at the specimen plane.

In order to control the scan direction of the light sheet, for example, either scan direction 225 or scan direction 235 illustrated in FIGS. 2A and 2B, respectively, orientation control module 124 is utilized to orient the oblique light sheet in the specimen plane with respect of the optical axis so that the light sheet can be scanned with respect to the specimen from different directions (i.e., along the y-axis) using the same primary objective.

As discussed above, volumetric images can be formed by illuminating the specimen using light sheets oriented in multiple planes, with the light sheet defining illumination/detection planes positioned at multiple positions with respect to the specimen. These multiple positions can be achieved by any combination of scanning of the light sheets using scanning of the rotating mirror, scanning of the objectives, and/or motion of the specimen with respect to the light sheets using the specimen stage. One of ordinary skill in the art would recognize many variations, modifications, and alternatives.

Figure 4A:
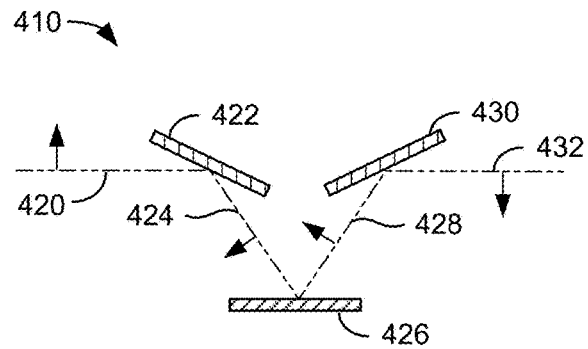
FIG. 4A is a simplified cross-sectional diagram illustrating an orientation control module in a first configuration according to an embodiment of the present invention.

FIG. 4A is a simplified cross-sectional diagram illustrating an orientation control module 410 in a first configuration according to an embodiment of the present invention. Referring to FIG. 4A, input light sheet 420 (i.e., light received from lens 122 in FIG. 1A) is incident on orientation control module 410. The orientation of the light sheet is represented by the arrow pointing away from input light sheet 420. Input light sheet 420 reflects from mirrors 422, 426, and 430, thereby experiencing three reflections passing through orientation control module 410. As a result of the odd number of reflections, the orientation of light sheet 424 is flipped with respect to input light sheet 420, the orientation of light sheet 428 is the same as input light sheet 420, and the orientation of output light sheet 432 is flipped with respect to input light sheet 420. Referring to FIG. 2A, if light sheet 220 oriented at a scan angle α with respect to the optical axis passed through orientation control module 410, it would be converted to light sheet 230 oriented at a scan angle −α as illustrated in FIG. 2B.

Figure 4B:
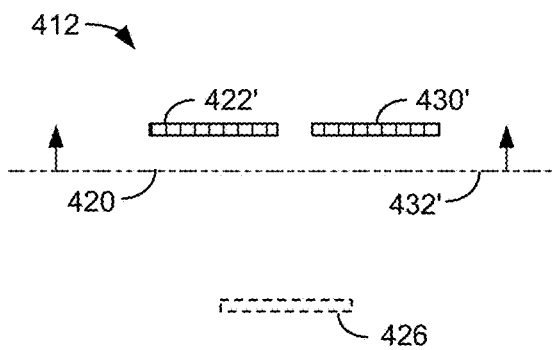
FIG. 4B is a simplified cross-sectional diagram illustrating the orientation control module shown in FIG. 4A in a second configuration according to an embodiment of the present invention.

FIG. 4B is a simplified cross-sectional diagram illustrating the orientation control module shown in FIG. 4A in a second configuration according to an embodiment of the present invention. In this second configuration, the orientation of input light sheet 420 (i.e., light received from lens 122 in FIG. 1A) is unchanged as it passes through orientation control module 412. Referring to FIG. 4B, mirrors 422' and 430' are rotated such that input light sheet 420 is not reflected from either mirror 422' or 430'. As a result of the even number of reflections (i.e., zero reflections), the orientation of output light sheet 432' is the same as input light sheet 420. Referring to FIGS. 2A and 2B, a light sheet oriented at a scan angle (either α or −α) with respect to the optical axis would be unchanged after passing through orientation control module 412 in the second configuration.

In addition to mirrors that can rotate out of the optical path, mirrors that rotate and redirect the incoming light to impinge on different mirrors can be utilized.

Figure 4C:
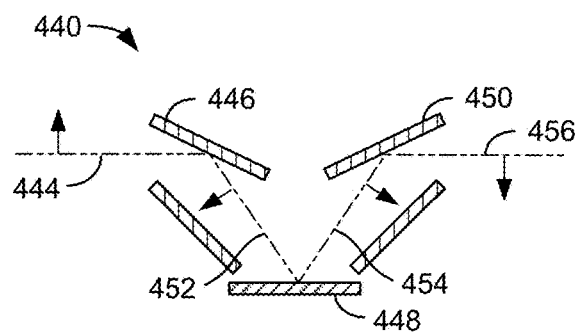
FIG. 4C is a simplified cross-sectional diagram illustrating an alternative orientation control module in a first configuration according to an embodiment of the present invention.
Figure 4D:
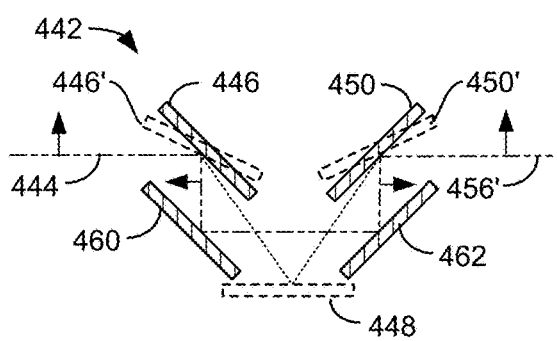
FIG. 4D is a simplified cross-sectional diagram illustrating the alternative orientation control module shown in FIG. 4C in a second configuration according to an embodiment of the present invention.

FIG. 4C is a simplified cross-sectional diagram illustrating an alternative orientation control module in a first configuration according to an embodiment of the present invention. FIG. 4D is a simplified cross-sectional diagram illustrating the alternative orientation control module shown in FIG. 4C in a second configuration according to an embodiment of the present invention.

Referring to FIG. 4C, input light sheet 444 (i.e., light received from lens 122 in FIG. 1A) is incident on orientation control module 440. The orientation of the light sheet is represented by the arrow pointing away from input light sheet 444. Input light sheet 444 reflects from mirrors 446, 448, and 450, thereby experiencing three reflections passing through orientation control module 410 in a manner similar to that discussed in relation to FIG. 4A. As a result of the odd number of reflections, the orientation of light sheet 452 is flipped with respect to input light sheet 444, the orientation of light sheet 454 is the same as input light sheet 444, and the orientation of output light sheet 456 is flipped with respect to input light sheet 444. Referring to FIG. 2A, if light sheet 220 oriented at a scan angle α with respect to the optical axis passed through orientation control module 440, it would be converted to light sheet 230 oriented at a scan angle −α as illustrated in FIG. 2B.

Referring to FIG. 4D, in this second configuration, the orientation of input light sheet 444 (i.e., light received from lens 122 in FIG. 1A) is unchanged as it passes through orientation control module 442. Mirrors 446' and 450' are rotated such that input light sheet 444 is reflected to impinge on mirror 460, which reflects light to impinge on mirror 462, which reflects light to impinge on mirror 450'. As a result of the even number of reflections (i.e., four reflections), the orientation of output light sheet 456' is the same as input light sheet 444. Referring to FIGS. 2A and 2B, a light sheet oriented at a scan angle (either α or −α) with respect to the optical axis would be unchanged after passing through orientation control module 442 in the second configuration.

Thus, using orientation control module 410 or orientation control module 440, embodiments of the present invention can change the orientation of the obliquely illuminated plane at the focal plane of the secondary objective so that the image is always in-focus on the camera.

Thus, as illustrated by FIGS. 4C and 4D, dual light sheet illumination and detection for multi-view imaging is provided by embodiments of the present invention. With the large imaging volume achieved, the embodiments described herein are able to image large samples. The inventors determined that a challenge associated with large samples was that large samples have occluding, refracting, and scattering structures, which could reduce image quality. In order to improve the optical coverage and to achieve consistent image quality, some embodiments of the present invention optically alternate the light sheet illumination and the viewing direction (orthogonal to the light-sheet) between ±45° with respect to the optical axis and image the sample sequentially to provide a pair of complementary orthogonal views. As illustrated in FIGS. 4C-4D, this can be achieved by using mirrors 446 and 450 (e.g., galvanometer mirrors) to quickly alternate between two optical paths. One path, illustrated in FIG. 4D, has two additional mirrors 460 and 462, while the other path, illustrated in FIG. 4C, adds only one, hence effectively flipping the light with respect to the optical axis. The inventors have determined that this image flipping module affects both illumination and detection plane simultaneously so that the imaging plane always falls on the glass surface of the tertiary objective regardless of whether the illumination light goes through the sample from left or right. Consequently, both views share the same downstream and upstream optical path, largely simplifying the optical setup and avoiding additional cost. The orthogonal image planes will benefit from the contrasting trajectories into the sample, in many cases avoiding obstacles and therefore returning complementary information that can be fused during post processing.

Embodiments of the present invention utilize a light sheet projection module, also referred to as a view switching module, to controllably, and potentially, sequentially switch the optical path to impinge on and pass through one of the primary objectives, i.e., either objective 140 or objective 150. By providing the ability to image through either of the primary objectives, opaque specimens can be imaged to produce volumetric images. Since opaque specimens absorb incident light as it propagates in the specimen, the ability to image from both sides of the specimen improves the imaging results in comparison with systems that are only able to image from a single side of the specimen. In fluorescent imaging implementations, the light sheet projection module not only reflects excitation light towards one of the primary objectives, but also directs the fluorescent emission collected by the primary objective towards downstream elements.

Figure 5A:
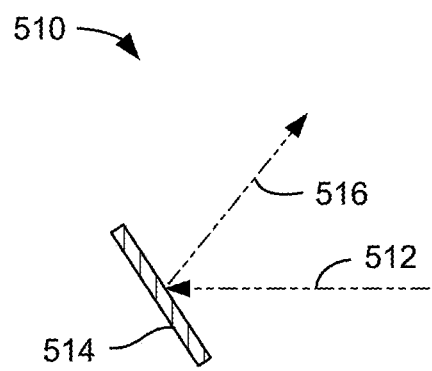
FIG. 5A is a simplified cross-sectional diagram illustrating a light sheet projection module in a first configuration according to an embodiment of the present invention.

FIG. 5A is a simplified cross-sectional diagram illustrating a light sheet projection module 510 in a first configuration according to an embodiment of the present invention. In this first configuration, light can be directed to impinge on and pass through objective 140. As illustrated in FIG. 5A, incoming light 512 (e.g., light incident from rotating mirror 128 illustrated in FIG. 1A) is received at mirror 514, which is tilted at a predetermined angle with respect to incoming light 512, resulting in reflection of outgoing light 516 exiting light sheet projection module 510 at a predetermined exit angle.

Figure 5B:
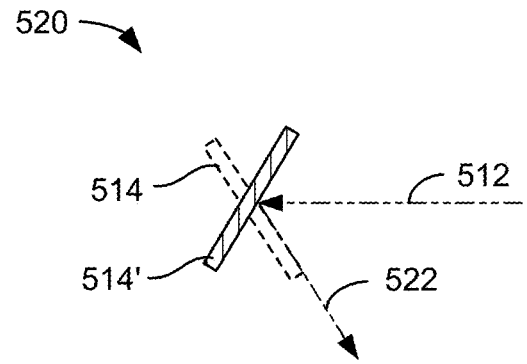
FIG. 5B is a simplified cross-sectional diagram illustrating the light sheet projection module shown in FIG. 5A in a second configuration according to an embodiment of the present invention.

FIG. 5B is a simplified cross-sectional diagram illustrating the light sheet projection module shown in FIG. 5A in a second configuration according to an embodiment of the present invention. As illustrated in FIG. 5B, during operation of light sheet projection module 520, mirror 514' has been rotated with respect to the predetermined angle at which it was positioned with respect to incoming light 512. As a result, outgoing light 522 exits light sheet projection module 520 at a second predetermined exit angle suitable for impingement on objective 150. Thus, using mirror 514, which can be rotated so that it is disposed in one of two orientations, light sheet projection module 510 can be utilized to controllably and, in some embodiments, sequentially, switch the optical path to impinge on and pass through either objective 140 or objective 150 as suitable for performing volumetric imaging from either side of the specimen as a result of the mirror rotation.

Figure 5C:
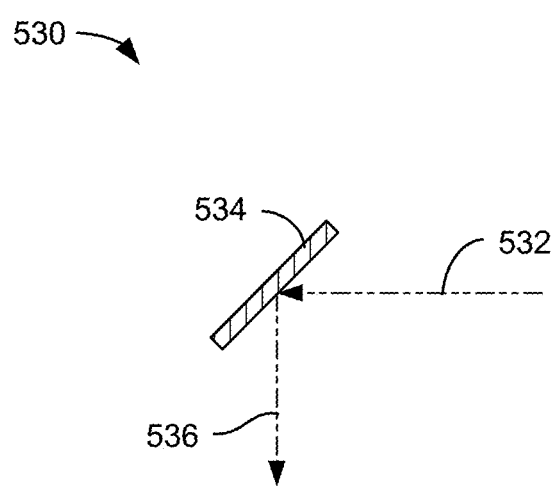
FIG. 5C is a simplified cross-sectional diagram illustrating an alternative light sheet projection module in a first configuration according to an embodiment of the present invention.

FIG. 5C is a simplified cross-sectional diagram illustrating an alternative light sheet projection module in a first configuration according to an embodiment of the present invention. In this embodiment, utilizing a mirror that is rotated out of the optical path (i.e., a mirror that flips out of the optical path), movement of the mirror into and out of the optical path enables an incoming light beam to be directed to either of the two primary objectives in a manner similar to that discussed in relation to FIGS. 5A and 5B. Thus, utilization of either of the light sheet projection modules illustrated in FIGS. 5A/5B and FIGS. 5C/5D, results in the downstream optical path after the light sheet projection module (i.e., towards detector 160 in FIG. 1A) is the same for both primary objectives.

Referring to FIG. 5C, incoming light 532 (e.g., light incident from rotating mirror 128 illustrated in FIG. 1A) is received at mirror 534 of light sheet projection module 530, which is tilted at a predetermined angle with respect to incoming light 532, resulting in reflection of outgoing light 536 exiting light sheet projection module 530 at a predetermined exit angle.

Figure 5D:
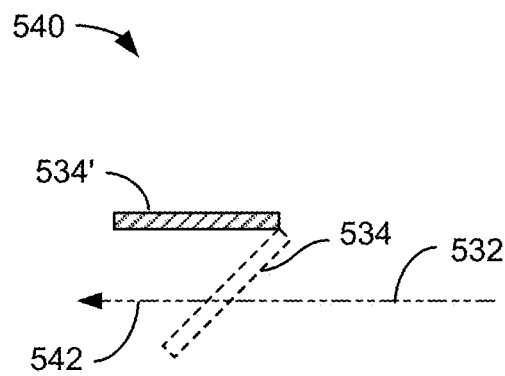
FIG. 5D is a simplified cross-sectional diagram illustrating the alternative light sheet projection module shown in FIG. 5C in a second configuration according to an embodiment of the present invention.

FIG. 5D is a simplified cross-sectional diagram illustrating the alternative light sheet projection module shown in FIG. 5C in a second configuration according to an embodiment of the present invention. As illustrated in FIG. 5C, during operation of alternative light sheet projection module 540, mirror 534' is rotated such that incoming light 532 is not reflected from mirror 534'. As a result, outgoing light 542 is collinear with incoming light 532. Thus, light incident on the alternative light sheet projection module 540 will be unchanged after passing through the alternative light sheet projection module 540 in this second configuration.

In some implementations, the light sheet projection module can also include optical elements operable to change the angle of the light sheet at the pupil plane of either objective 140 or objective 150. Accordingly, control of these optical elements can be used to laterally shift the light sheet at the specimen as discussed in relation to the operation of rotating mirror 128. One of ordinary skill in the art would recognize many variations, modifications, and alternatives.

Figure 6A:
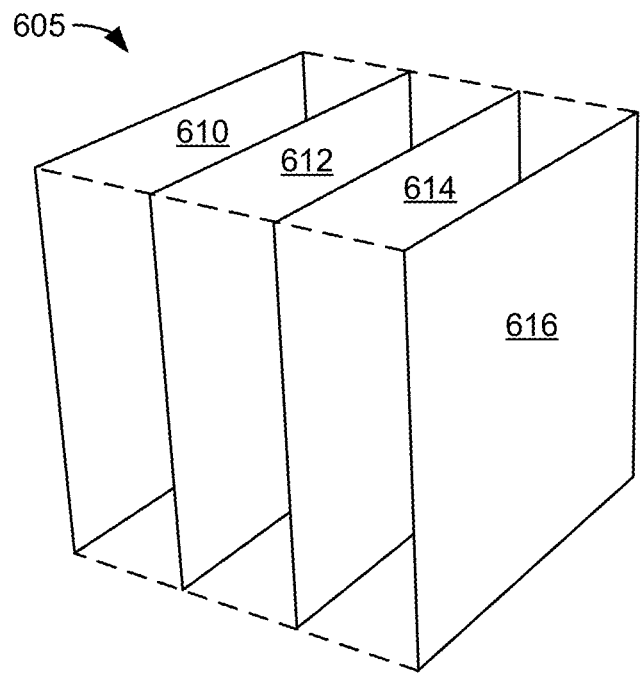
FIG. 6A is a simplified perspective drawing showing scanning of a light sheet through a specimen with the light sheet being disposed at a predetermined angle and scanning from a first side according to an embodiment of the present invention.
Figure 6B:
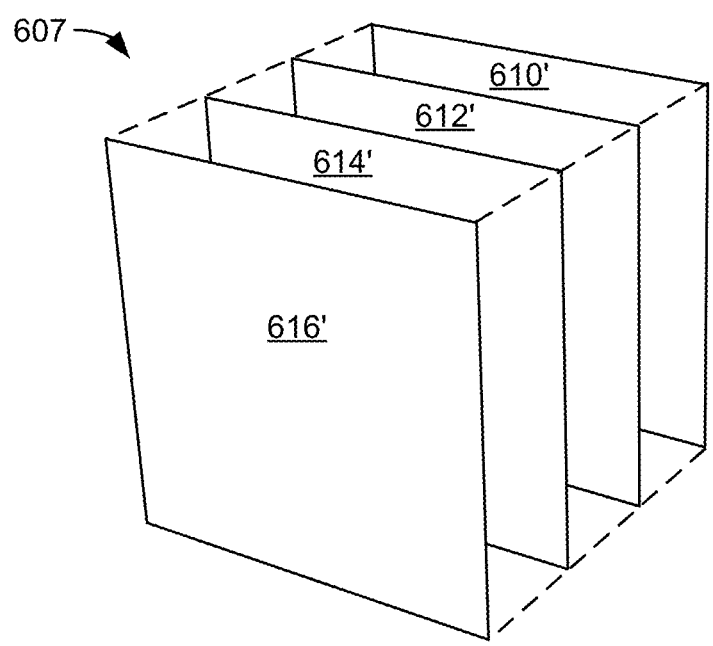
FIG. 6B is a simplified perspective drawing showing scanning of a light sheet through the specimen with the light sheet being disposed at a corresponding predetermined angle according to an embodiment of the present invention.
Figure 6C:
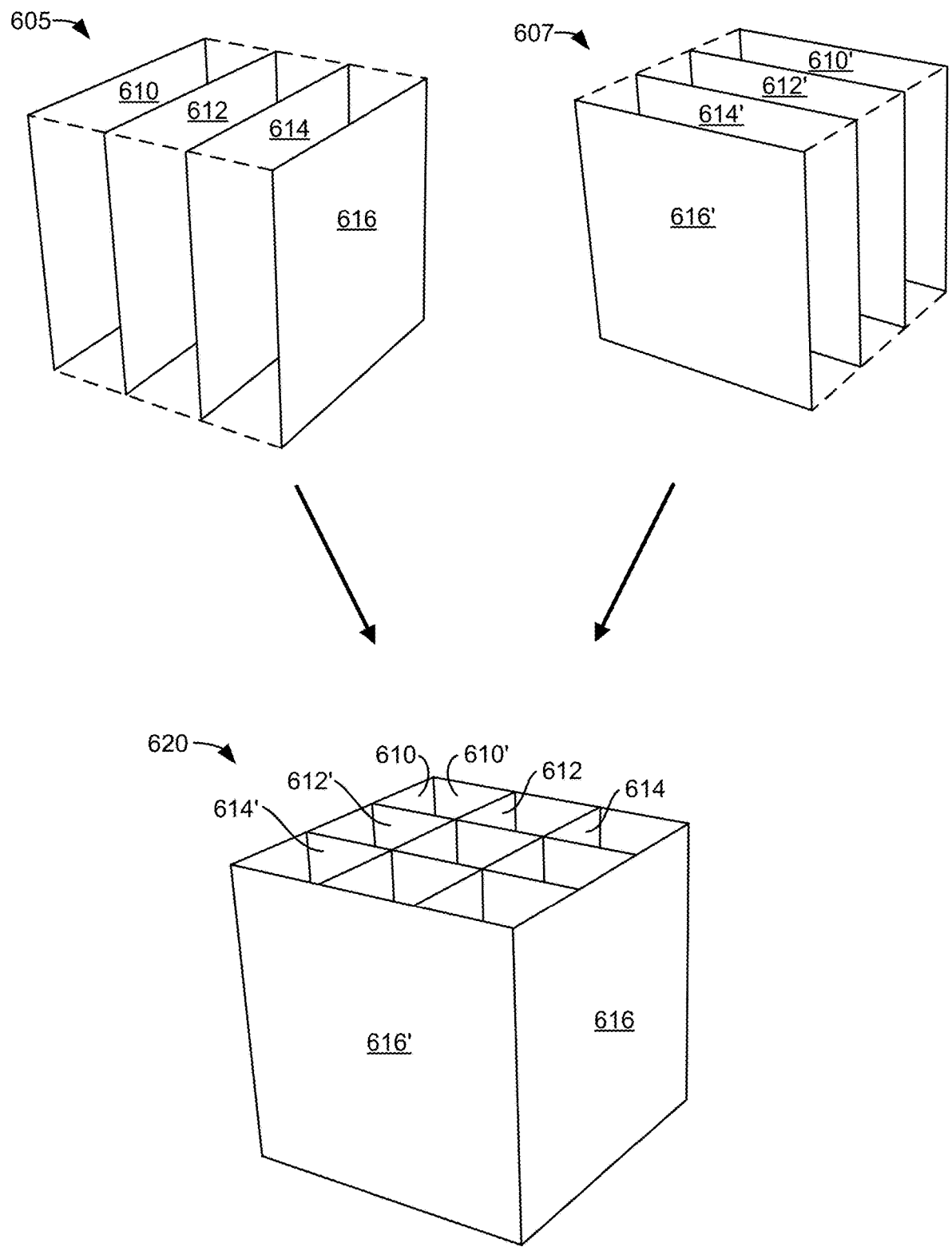
FIG. 6C is a simplified perspective drawing illustrating fusing of data illustrated in FIGS. 6A and 6B.

FIG. 6A is a simplified perspective drawing showing scanning of a light sheet disposed at a predetermined angle through a specimen and scanning from a first side according to an embodiment of the present invention. Referring to FIG. 1A, when light sheet projection module 132 is in a first configuration, light is incident on objective 140 from mirror 138. The imaging operations illustrated in FIGS. 6A-6C are performed when light sheet projection module 132 is in this first configuration. As discussed in relation to FIG. 2A, orientation control module 124 can be disposed in a configuration that orients the light sheet at scan angle α with respect to the optical axis (i.e., the z-axis). FIG. 6A illustrates a light sheet at the specimen plane disposed in four positions, referenced as light sheet position 610, light sheet position 612, light sheet position 614, and light sheet position 616. Referring to FIGS. 1, 2A, and 6A, illumination of specimen 142 through objective 140 is illustrated at a first time by light sheet position 610 oriented at scan angle α with respect to the optical axis. In order to obtain a volumetric image of the specimen from the first side of specimen 142 facing objective 140, the light sheet is scanned along scan direction 225, which is illustrated by the scanning of the light sheet to light sheet position 612, light sheet position 614, and light sheet position 616. As discussed above, scanning of the light sheet can be performed in one of several manners, including implementations in which the specimen stage is translated along the z-axis and, to compensate for this motion of the specimen stage during imaging, rotating mirror 128 is used to descan specimen 142, preserving the specimen in a fixed position during imaging. The fixed position of the specimen during imaging is thus illustrated by the discrete light sheet positions illustrated in FIG. 6A.

Detector 160 is utilized to obtain an image of specimen 142 at the plane represented by light sheet position 610. The light sheet is then translated to light sheet position 612 and detector 160 is then utilized to obtain a second image of specimen 142 at the plane represented by light sheet position 612. This process is then repeated multiple times to obtain a plurality of images, each associated with a plane of the specimen. Accordingly, the light sheet is scanned across the specimen in a first scan direction and a first volumetric image 605 of the specimen is obtained using light collected through objective 140 and imaged at detector 160. Thus, in FIG. 6A, the series of light sheet positions represents not only the illumination of the specimen using the light sheet, but also the imaging of the portion of the specimen aligned with the light sheet to form an image in the set of images making up the first volumetric image.

It should be appreciated that although the spacing between adjacent light sheet positions is illustrated as a uniform spacing in FIG. 6A, this is not required by the present invention and a non-uniform spacing between adjacent light sheets may be utilized in some embodiments, for example, for specimens with non-uniform density distributions. As an example, the spacing between adjacent light sheets may be set at a default value. As images are collected with the light sheet in several light sheet positions, image analysis can be performed to determine that the density of the specimen is low, resulting in an increase in the spacing between adjacent light sheets. Later, as the density of the specimen increases, the spacing between adjacent light sheets can be decreased accordingly. In other embodiments, a uniform spacing is utilized for one type of specimen and a different, but uniform, spacing is utilized for another type of specimen. One of ordinary skill in the art would recognize many variations, modifications, and alternatives.

FIG. 6B is a simplified perspective drawing showing scanning of a light sheet through the specimen with the light sheet being disposed at a corresponding predetermined angle according to an embodiment of the present invention. Referring to FIG. 2B, orientation control module 124 has now been disposed in a second configuration that orients the light sheet at scan angle −α with respect to the optical axis (i.e., the z-axis). Accordingly, in FIG. 6B, the light sheet at the specimen plane is now disposed in four positions that correspond to reoriented versions of the light sheet positions illustrated in FIG. 6A, namely light sheet position 610', light sheet position 612', light sheet position 614', and light sheet position 616'.

As discussed in relation to FIG. 6A, FIG. 6B illustrates illumination of specimen 142 through objective 140 with orientation control module 124 disposed in the second configuration, which has modified the orientation of the light sheet, resulting in the light sheet being oriented at a scan angle −α with respect to the optical axis. Scanning of the light sheet through a plurality of sequential positions is illustrated by light sheet positions 610', light sheet position 612', light sheet position 614', and light sheet position 616'. Thus, a second volumetric image 607 of the specimen from the first side of specimen 142 facing objective 140 is obtained as the light sheet is scanned along scan direction 235. As discussed above, scanning of the light sheet can be performed in one of several manners, including implementations in which the specimen stage is translated along the z-axis and, to compensate for this motion of the specimen stage during imaging, rotating mirror 128 is used to descan specimen 142, preserving the specimen in a fixed position during imaging. The fixed position of the specimen during imaging is thus illustrated by the discrete light sheet positions illustrated in FIG. 6B.

Referring to FIGS. 1A, 2B, and 6B, detector 160 is utilized to obtain an image of specimen 142 at the plane represented by light sheet position 610'. The light sheet is then translated to light sheet position 612' and detector 160 is then utilized to obtain a second image of specimen 142 at the plane represented by light sheet position 612'. This process is then repeated multiple times to obtain a plurality of images, each associated with a plane of the specimen. Accordingly, the light sheet is scanned across the specimen in the second scan direction and a second volumetric image of the specimen is obtained using light collected through objective 140 and imaged at detector 160. Thus, in FIG. 6B, the series of light sheet positions represents not only the illumination of the specimen using the light sheet, but also the imaging of the portion of the specimen aligned with the light sheet to form an image in the set of images making up the second volumetric image.

Accordingly, specimen 142 is imaged using objective 140 to form a set of volumetric images that overlap in a region of the specimen since, in this embodiment, the same region of the specimen is imaged while forming first volumetric image 605 and second volumetric image 607. As will be evident to one of skill in the art, the overlap between first volumetric image 605 and second volumetric image 607 need not be absolute since later fusing processes may form an intermediate image from portions of the images included in the volumetric images, a subset of the total number of images included in the volumetric images, or the like.

FIG. 6C is a simplified perspective drawing illustrating fusing of data illustrated in FIGS. 6A and 6B. In FIG. 6C, the individual images making up first volumetric image 605 illustrated in FIG. 6A and second volumetric image 607 illustrated in FIG. 6B are combined or fused to generate intermediate image 620. In order to fuse the volumetric images, each of the pixels in intermediate image 620 is assembled by considering first volumetric image 605 and second volumetric image 607 to determine which corresponding pixel in the volumetric images provides the most meaningful signal for use in intermediate image 620. Metrics that can be utilized in determining which pixels in the volumetric images provide the most meaningful signal can include the signal to noise ratio, brightness and contrast invariance, noise invariance, normalized DCT Shannon entropy (DCTS), and the like. As an example, if first volumetric image 605 and second volumetric image 607 are images having M×N pixels, then to define pixel (m,n) in intermediate image 620, pixel (m,n) in first volumetric image 605 is compared to pixel (m,n) in second volumetric image 607 to determine which of these pixels should be utilized in generating intermediate image 620 characterized by high resolution and image quality.

Figure 6D:
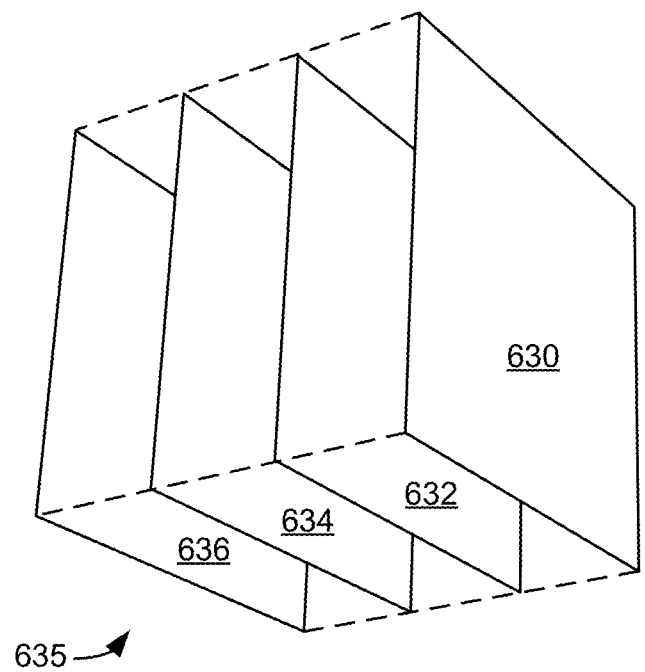
FIG. 6D is a simplified perspective drawing showing scanning of a light sheet through a specimen with the light sheet being disposed at a predetermined angle and scanning from a second side according to an embodiment of the present invention.
Figure 6E:
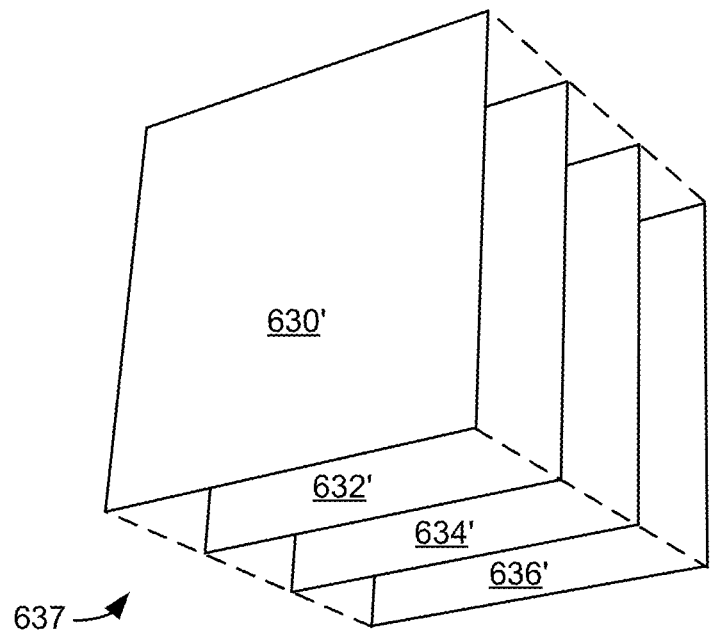
FIG. 6E is a simplified perspective drawing showing scanning of a light sheet through the specimen with the light sheet being disposed at a corresponding predetermined angle according to an embodiment of the present invention.
Figure 6F:
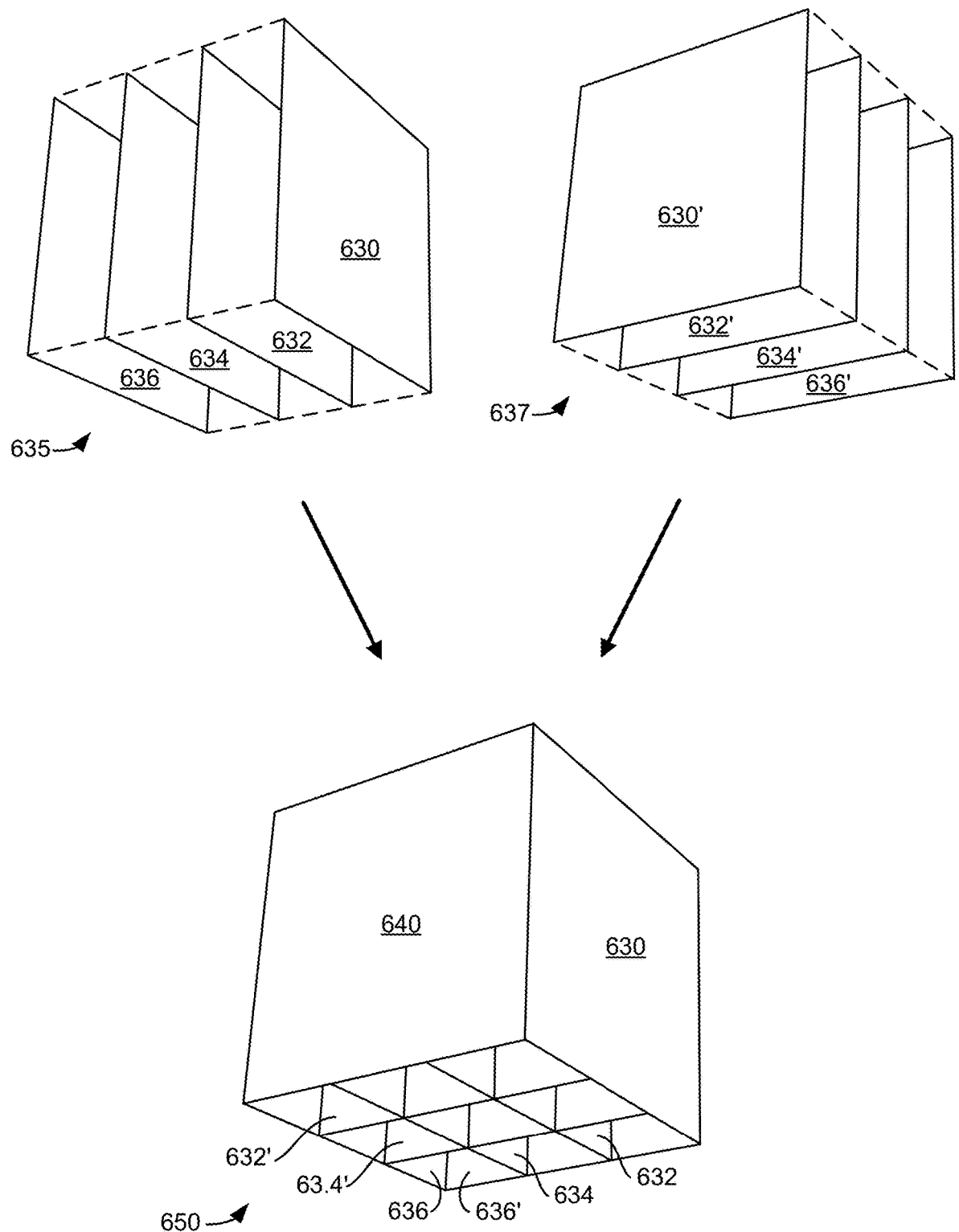
FIG. 6F is a simplified perspective drawing illustrating fusing of data illustrated in FIGS. 6D and 6E.
Figure 6G:
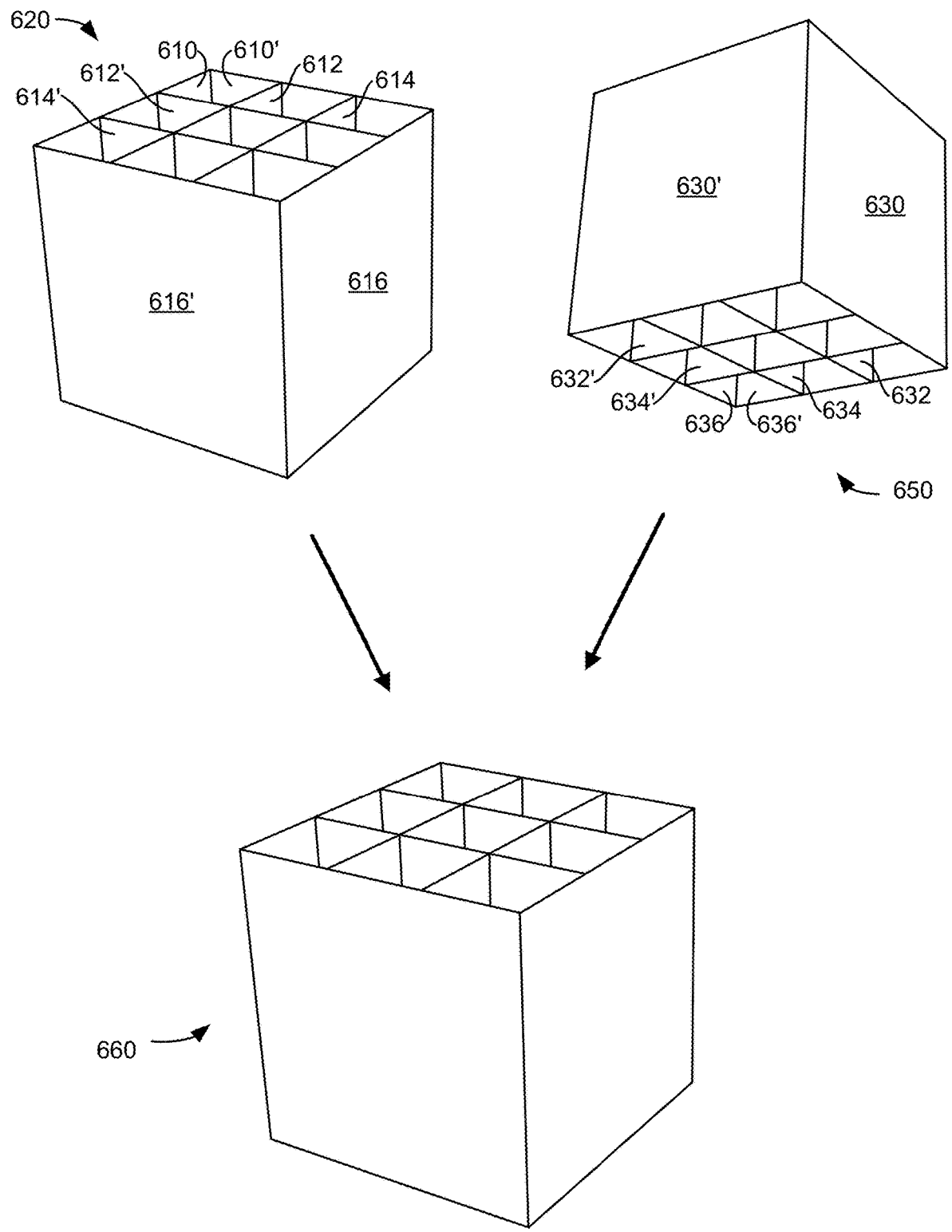
FIG. 6G is a simplified perspective drawing illustrating fusing of data illustrated in FIGS. 6C and 6F.

FIG. 6D is a simplified perspective drawing showing scanning of a light sheet through a specimen with the light sheet being disposed at a predetermined angle and scanning from a second side according to an embodiment of the present invention. Referring to FIG. 1A, when light sheet projection module 132 is in a second configuration, light is incident on objective 150 from mirror 148. The imaging operations illustrated in FIGS. 6D-6F are performed when light sheet projection module 132 is in this second configuration. As discussed in relation to FIG. 2A, orientation control module 124 can be disposed in a configuration that orients the light sheet at scan angle α with respect to the optical axis (i.e., the z-axis). FIG. 6D illustrates a light sheet at the specimen plane disposed in four positions, referenced as light sheet position 630, light sheet position 632, light sheet position 634, and light sheet position 636. Referring to FIGS. 1A, 2A, and 6D, illumination of specimen 142 through objective 150 is illustrated at a first time by light sheet position 630 oriented at scan angle α with respect to the optical axis. In order to obtain a volumetric image of the specimen from the second side of specimen 142 facing objective 150, the light sheet is scanned along scan direction 225, which is illustrated by the scanning of the light sheet to light sheet position 632, light sheet position 634, and light sheet position 636. Alternatively, the light sheet could be scanned along a direction opposite to scan direction 225.

As discussed above, scanning of the light sheet can be performed in one of several manners, including implementations in which the specimen stage is translated along the z-axis and, to compensate for this motion of the specimen stage during imaging, rotating mirror 128 is used to descan specimen 142, preserving the specimen in a fixed position during imaging. The fixed position of the specimen during imaging is thus illustrated by the discrete light sheet positions illustrated in FIG. 6D.

Detector 160 is utilized to obtain an image of specimen 142 at the plane represented by light sheet position 630. The light sheet is then translated to light sheet position 632 and detector 160 is then utilized to obtain a second image of specimen 142 at the plane represented by light sheet position 633. This process is then repeated multiple times to obtain a plurality of images, each associated with a plane of the specimen. Accordingly, the light sheet is scanned across the specimen in a first scan direction and a first volumetric image 635 of the specimen is obtained using light collected through objective 150 and imaged at detector 160. Thus, in FIG. 6D, the series of light sheet positions represents not only the illumination of the specimen using the light sheet, but also the imaging of the portion of the specimen aligned with the light sheet to form an image in the set of images making up the third volumetric image.

It should be appreciated that although the spacing between adjacent light sheet positions is illustrated as a uniform spacing in FIG. 6D, this is not required by the present invention and a non-uniform spacing between adjacent light sheets may be utilized in some embodiments, for example, for specimens with non-uniform density distributions. As an example, the spacing between adjacent light sheets may be set at a default value. As images are collected with the light sheet in several light sheet positions, image analysis can be performed to determine that the density of the specimen is low, resulting in an increase in the spacing between adjacent light sheets. Later, as the density of the specimen increases, the spacing between adjacent light sheets can be decreased accordingly. In other embodiments, a uniform spacing is utilized for one type of specimen and a different, but uniform, spacing is utilized for another type of specimen. One of ordinary skill in the art would recognize many variations, modifications, and alternatives.

FIG. 6E is a simplified perspective drawing showing scanning of a light sheet through the specimen with the light sheet being disposed at a corresponding predetermined angle according to an embodiment of the present invention. Referring to FIG. 2B, orientation control module 124 has now been disposed in the second configuration that orients the light sheet at scan angle −α with respect to the optical axis (i.e., the z-axis). Accordingly, in FIG. 6E, the light sheet at the specimen plane is now disposed in four positions that correspond to reoriented versions of the light sheet positions illustrated in FIG. 6D, namely light sheet position 630', light sheet position 632', light sheet position 634', and light sheet position 636'.

As discussed in relation to FIG. 6D, FIG. 6E illustrates illumination of specimen 142 through objective 150 with orientation control module 124 disposed in the second configuration, which has modified the orientation of the light sheet, resulting in the light sheet being oriented at a scan angle −α with respect to the optical axis. Scanning of the light sheet through a plurality of sequential positions is illustrated by light sheet positions 630', light sheet position 632', light sheet position 634', and light sheet position 636'. Thus, a second volumetric image 637 of the specimen from the second side of specimen 142 facing objective 150 is obtained as the light sheet is scanned along scan direction 235. As discussed above, scanning of the light sheet can be performed in one of several manners, including implementations in which the specimen stage is translated along the z-axis and, to compensate for this motion of the specimen stage during imaging, rotating mirror 128 is used to descan specimen 142, preserving the specimen in a fixed position during imaging. The fixed position of the specimen during imaging is thus illustrated by the discrete light sheet positions illustrated in FIG. 6E.

Referring to FIGS. 1A, 2B, and 6E, detector 160 is utilized to obtain an image of specimen 142 at the plane represented by light sheet position 630'. The light sheet is then translated to light sheet position 632' and detector 160 is then utilized to obtain a second image of specimen 142 at the plane represented by light sheet position 632'. This process is then repeated multiple times to obtain a plurality of images, each associated with a plane of the specimen. Accordingly, the light sheet is scanned across the specimen in the second scan direction and a second volumetric image of the specimen is obtained using light collected through objective 150 and imaged at detector 160. Thus, in FIG. 6E, the series of light sheet positions represents not only the illumination of the specimen using the light sheet, but also the imaging of the portion of the specimen aligned with the light sheet to form an image in the set of images making up the second volumetric image.

Accordingly, specimen 142 is imaged using objective 150 to form a set of volumetric images that overlap in a region of the specimen since, in this embodiment, the same region of the specimen is imaged while forming first volumetric image 635 and second volumetric image 637. As will be evident to one of skill in the art, the overlap between first volumetric image 635 and second volumetric image 637 need not be absolute since later fusing processes may form an intermediate image from portions of the images included in the volumetric images, a subset of the total number of images included in the volumetric images, or the like.

FIG. 6F is a simplified perspective drawing illustrating fusing of data illustrated in FIGS. 6D and 6E. In FIG. 6F, the individual images making up first volumetric image 635 illustrated in FIG. 6D and second volumetric image 637 illustrated in FIG. 6E are combined or fused to generate intermediate image 650. In order to fuse the first volumetric image and the second volumetric image, each of the pixels in intermediate image 650 is assembled by considering first volumetric image 635 and second volumetric image 637 to determine which corresponding pixel in the volumetric images provides the most meaningful signal for use in intermediate image 650. Metrics that can be utilized in determining which pixels in the volumetric images provide the most meaningful signal can include the signal to noise ratio, brightness and contrast invariance, noise invariance, normalized DCT Shannon entropy (DCTS), and the like. As an example, if first volumetric image 635 and second volumetric image 637 are images having M×N pixels, then to define pixel (m,n) in intermediate image 650, pixel (m,n) in first volumetric image 635 is compared to pixel (m,n) in second volumetric image 637 to determine which of these pixels should be utilized in generating intermediate image 650 characterized by high resolution and image quality.

FIG. 6G is a simplified perspective drawing illustrating fusing of data illustrated in FIGS. 6C and 6F. As illustrated in FIG. 6G, intermediate image 620 is fused with intermediate image 650 to form fused image 660. The image fusion operation is similar to the fusion operation that was performed to generate intermediate image 620 and intermediate image 650.

In order to generate the fused image, each of the pixels in fused image 660 is assembled by considering intermediate image 620 and intermediate image 650 to determine which corresponding pixel in the intermediate images provides the most meaningful signal for use in the fused image. Metrics that can be utilized in determining which pixels in the intermediate images provide the most meaningful signal can include the signal to noise ratio, brightness and contrast invariance, noise invariance, normalized DCT Shannon entropy (DCTS), and the like. As an example, if intermediate image 620 and intermediate image 650 are images having M×N pixels, then to define pixel (m,n) in fused image 660, pixel (m,n) in intermediate image 620 is compared to pixel (m,n) in intermediate image 650 to determine which of these pixels should be utilized in generating fused image 660 characterized by high resolution and image quality.

Since each of the four volumetric images is obtained from a different perspective, the use of all four volumetric images to form fused image 660 enables the fused image to have higher resolution than achievable using a single volumetric image. Considering a specimen that is somewhat opaque, because the illumination will be absorbed as it propagates into the specimen and the reflected or emitted light will be absorbed as it propagates back toward the primary objective, the portions of the specimen closest to one of the primary objectives will be imaged most clearly in the volumetric images formed using that primary objective. Accordingly, some embodiments of the present invention collect four or more images from different perspectives since each of the images will contain data on the portions of the specimen closest to the particular primary objective measured along the direction normal to the light sheet.

Figure 7:
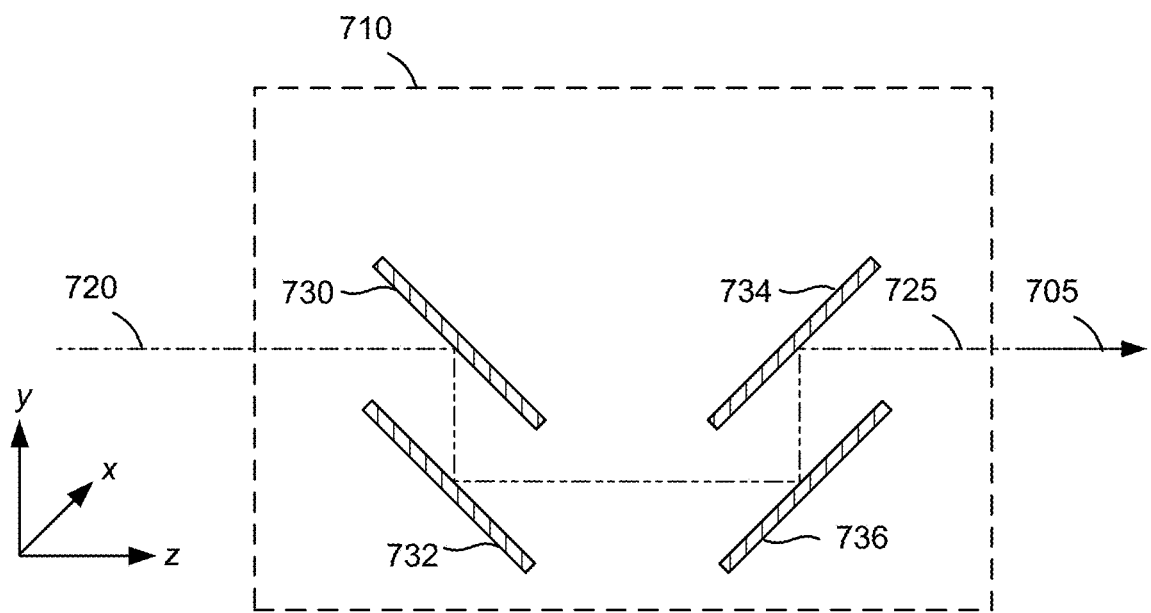
FIG. 7 is a simplified cross-sectional diagram illustrating an orientation/rotation control module according to an embodiment of the present invention.

FIG. 7 is a simplified cross-sectional diagram illustrating an orientation/rotation control module according to an embodiment of the present invention. This orientation/rotation control module can also be referred to as an image rotation module. Utilizing the orientation/rotation control module illustrated in FIG. 7, embodiments of the present invention are able to achieve an arbitrary number of orientations, expanding the two orientations illustrated in FIGS. 2A and 2B to an arbitrary number. Thus, rather than rotating the specimen to achieve a predetermined rotation of the light sheet around the z-axis, the use of the orientation/rotation control module illustrated in FIG. 7 enables rotation of the light sheet with respect to the specimen while maintaining the scan angle of the light sheet with respect to the optical axis at a fixed scan angle.

Referring to FIG. 7, for fluorescent emission, incoming light 720 from the primary objective (e.g., objective 140 or objective 150) is incident on orientation/rotation control module 710. Thus, as will be evident to one of skill in the art, rotation of orientation/rotation control module 710 around optical axis 705 is analogous to rotation of a Dove prism (in a beam rotator orientation) about an optical axis passing through the Dove prism. Incoming light 720 enters orientation/rotation control module 710 and reflects in turn from mirrors 730, 732, 734, and 736, exiting orientation/rotation control module 710 as outgoing light 725. Thus, incoming light 720 and outgoing light 725 are disposed along a common axis, i.e., optical axis 705.

In operation, orientation/rotation control module 710 is rotated around optical axis 705 aligned with the z-axis, to produce rotation of the oblique light sheet around optical axis 210 illustrated in FIGS. 2A and 2B. Considering the embodiment illustrated in FIG. 2A, light sheet 220 is disposed normal to the x-z plane and is oriented at scan angle $\alpha$ with respect to optical axis 210. As orientation/rotation control module 710 rotates around optical axis 705, light sheet 220, which can be referred to as an oblique light sheet, rotates around optical axis 210. If orientation/rotation control module 710 rotates 180° around optical axis 705, light sheet 220 will be oriented at scan angle $-\alpha$, resulting in the condition illustrated by light sheet 230, which can be referred to as an oblique light sheet, in FIG. 2B.

Thus, orientation/rotation control module 710 can be utilized to replace orientation control module 124 in some embodiments, with rotation of orientation/rotation control module 710 resulting in rotation of the oblique light sheet around the optical axis at the specimen. During rotation of orientation/rotation control module 710 and light sheet 220, the light sheet is characterized by the same scan angle with respect to the optical axis. Thus, rotation of the oblique light sheet at arbitrary angles around the optical axis can be achieved in a manner similar to that produced by rotation of specimen stage 143 around the z-axis. It will be noted that the intermediate image formed between 124 and 122 is also rotated so that it overlaps with the focal plane of tertiary objective 154 shown in FIG. 1A. Thus, orientation/rotation control module 710 enables the specimen to be observed from an arbitrary direction and with the light sheet always having the same scan angle, also referred to as an incident angle, which is useful for imaging large specimens in which the scattering of light shortens the light penetration depth.

Thus, in addition to imaging using light sheets oriented perpendicular to the y-z plane, the orientation/rotation control module 710 enables rotation of the light sheet around the z-axis such that imaging using light sheets that are tilted with respect to the normal y-z plane is enabled. As will be evident to one of skill in the art, in cases in which the specimen is not well positioned for imaging using light sheets that are oriented perpendicular to the y-z plane, the integration of orientation/rotation control module 710 in place of orientation control module 124 illustrated in FIG. 1A enables the specimen to be imaged from directions at which the specimen would be well positioned. Effectively, the rotation of the light sheet is equivalent to rotation of the specimen, enabling the specimen to be well positioned for imaging in many different actual specimen positions and orientations. The rapid imaging provided by embodiments of the present invention enables real time control of the imaging process. As an example, if a first volumetric image is obtained and the operator determines that imaging quality will be increased by modification of the directions from which the volumetric images are acquired, the orientation of the light sheet can be modified for subsequent image acquisition, effectively reorienting the specimen position/orientation, which is difficult in practice since it is unusual that the center of the specimen will be aligned with the center of the optical system. One of ordinary skill in the art would recognize many variations, modifications, and alternatives.

FIG. 8A is a simplified schematic diagram illustrating use of a water dipping objective as a primary objective according to an embodiment of the present invention. FIG. 8B is a simplified schematic diagram illustrating use of an immersion objective and a coverslip as a primary objective according to an embodiment of the present invention. As will be evident to one of skill in the art, a water immersion objective images through a coverslip, while a water dipping objective is put directly into water during imaging. The inventors have determined that using a water immersion objective could prove advantageous for imaging samples prepared in many modalities such as multi-well plates, microfluidic devices, and the like. In fact, the optical system utilizing water dipping objective 810 illustrated in FIG. 8A is, optically, substantially identical to the optical system utilizing immersion objective 830 and coverslip 832 illustrated in FIG. 8B, considered from either the focal space of water dipping objective 810 or immersion objective 830.

In FIG. 8A, water dipping objective 810 is analogous to objective 150 illustrated in FIG. 1A. Water dipping objective 810 does not require a coverslip and secondary objective 820 is an air objective that images through coverslip 822. Tertiary objective 824 is also illustrated. The pupil planes of water dipping objective 810 and secondary objective 820 are conjugated through 4f relay lenses (not shown) to fulfill remote focusing requirements. Referring to FIG. 1A, since objective 150 is positioned below specimen 142, it is not typically possible to use a water dipping objective since no coverslip is present between objective 150 and specimen 142. The inventors have determined that use of water dipping objective 810 in conjunction with coverslip 822 positioned adjacent secondary objective 820 is optically equivalent to use of immersion objective 830 and coverslip 832 in conjunction with secondary objective 850 with no coverslip as illustrated in FIG. 8B. This indicates that the coverslip can be placed either between secondary objective 820 and tertiary objective 824 as illustrated by coverslip 822 in FIG. 8A or between the specimen and immersion objective 830 as illustrated by coverslip 832 in FIG. 8B without introducing aberrations. Tertiary objective 854 is also illustrated.

Thus, some embodiments of the present invention utilize immersion objective 830 in conjunction with coverslip 832 as objective 150 in FIG. 1A to achieve results typically achieved using a water dipping objective.

Thus, according to embodiments of the present invention, the microscope can be converted from an upright configuration to an inverted configuration by repositioning the coverslip in a remote focusing system. As discussed in relation to FIG. 8A, the remote focusing system can include water dipping objective 810 and secondary objective 820, whose pupil planes are conjugated by a 4f relay system (not shown). As an example, specimen 142 can be imaged using a 20×, 1.0 NA water dipping objective as water dipping objective 810 and a 20×, 0.8 NA objective as secondary objective 820. During conventional operation, because water dipping objective 810 is a water dipping lens, water dipping objective 810 should be used directly facing specimen 142 without any coverslip between water dipping objective 810 and specimen 142. On the other hand, secondary objective 820 is utilized with coverslip 822 between secondary objective 820 and image plane 823. The configuration illustrated in FIG. 8A is well suited for an upright microscope in which the primary objective is used in a dipping configuration.

According to another embodiment of the present invention, coverslip 822 can be repositioned from the position adjacent image plane 823 of secondary objective 820 to that of water dipping objective 810. Referring to FIG. 8B, similar optical performance can be achieved by converting the system to an inverted configuration. As illustrated in FIG. 8B, immersion objective 830, which is a water dipping objective, images specimen 142 through coverslip 832, which can be integrated with media container 833 holding specimen 142. The insertion of coverslip 832 is accompanied by the removal of the coverslip adjacent secondary objective 850. As a result, the aberration that was introduced by the insertion of coverslip 832 is offset by the removal of the coverslip adjacent secondary objective 850. Thus, conversation from an upright to an inverted configuration is enabled by embodiments of the present invention.

Figure 9:
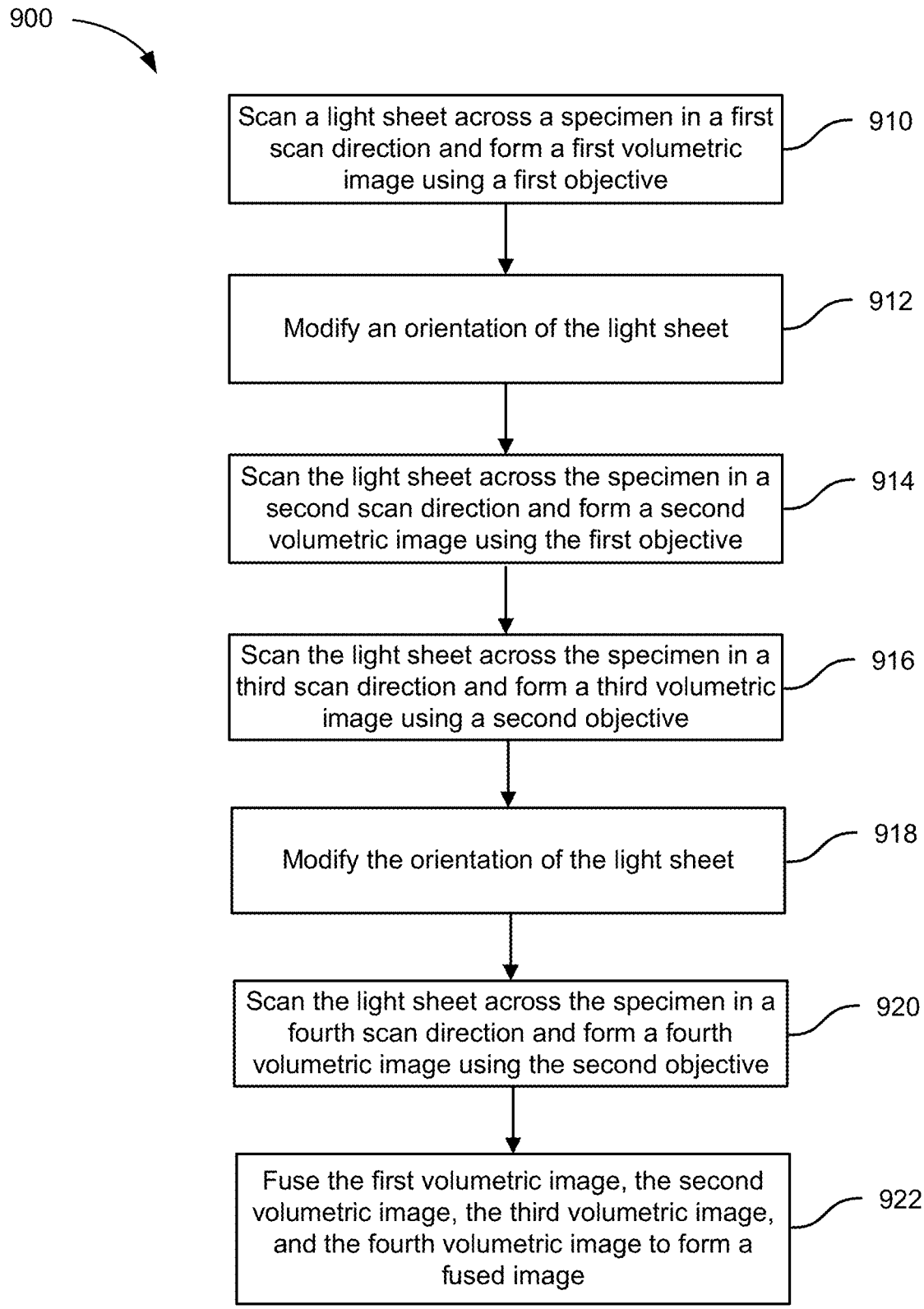
FIG. 9 is a simplified flowchart illustrating a method of performing imaging according to an embodiment of the present invention.

FIG. 9 is a simplified flowchart illustrating a method of performing imaging according to an embodiment of the present invention. As described below, the images of the specimen formed using the method illustrated in FIG. 9 are three-dimensional images, also referred to as volumetric images. Volumetric images from multiple orientations as well as multiple views can be fused to form both intermediate images and fused images.

Referring to FIG. 9, method 900 includes scanning a light sheet across a specimen in a first scan direction and forming a first volumetric image of the specimen using a first objective (910). Prior to scanning the light sheet in the first scan direction and forming the first volumetric image, the method can include using an angle adjustment module to dispose the light sheet at a predetermined scan angle with respect to an optical axis. This optical axis can pass through the first objective and the second objective and be normal to a specimen plane. As discussed above, the angle adjustment module can be disposed in a first state prior to scanning the light sheet across the specimen in the first scan direction and remain in the first state during scanning of the light sheet across the specimen in the second scan direction, the third scan direction, and the fourth scan direction as described more fully below.

In order to provide multiple orientations of the light sheet disposed at the predetermined scan angle, the method also includes modifying an orientation of the light sheet using an orientation control module (912) and scanning the light sheet across the specimen in a second scan direction and forming a second volumetric image of the specimen using the first objective (914). The absolute values of the scan angle between the first scan direction and the optical axis and the scan angle between the second scan direction and the optical axis can be equal, i.e., $\alpha$ and $-\alpha$.

The method further includes scanning the light sheet across the specimen in a third scan direction and forming a third volumetric image of the specimen using a second objective (916). Prior to scanning the light sheet in the third scan direction and forming the third volumetric image, the method can include using a light sheet projection module to direct the light sheet to pass through another objective that is utilized during scanning of the light sheet across the specimen in the third scan direction. After collection of the third volumetric image, the orientation of the light sheet is modified using the orientation control module (918). The method further includes scanning the light sheet across the specimen in a fourth scan direction and forming a fourth volumetric image of the specimen using the second objective (920). Using the four volumetric images, an image fusing operation is utilized to fuse the first volumetric image, the second volumetric image, the third volumetric image, and the fourth volumetric image to form a fused image (922).

In some embodiments, the first volumetric image, the second volumetric image, the third volumetric image, and the fourth volumetric image are fluorescent images. Moreover, forming the fused image can include fusing the first volumetric image and the second volumetric image to form a first intermediate image, fusing the third volumetric image and the fourth volumetric image to form a second intermediate image, and fusing the first intermediate image and the second intermediate image to form the fused image.

It should be appreciated that the specific steps illustrated in FIG. 9 provide a particular method of performing imaging according to an embodiment of the present invention. Other sequences of steps may also be performed according to alternative embodiments. For example, alternative embodiments of the present invention may perform the steps outlined above in a different order. Moreover, the individual steps illustrated in FIG. 9 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 10:
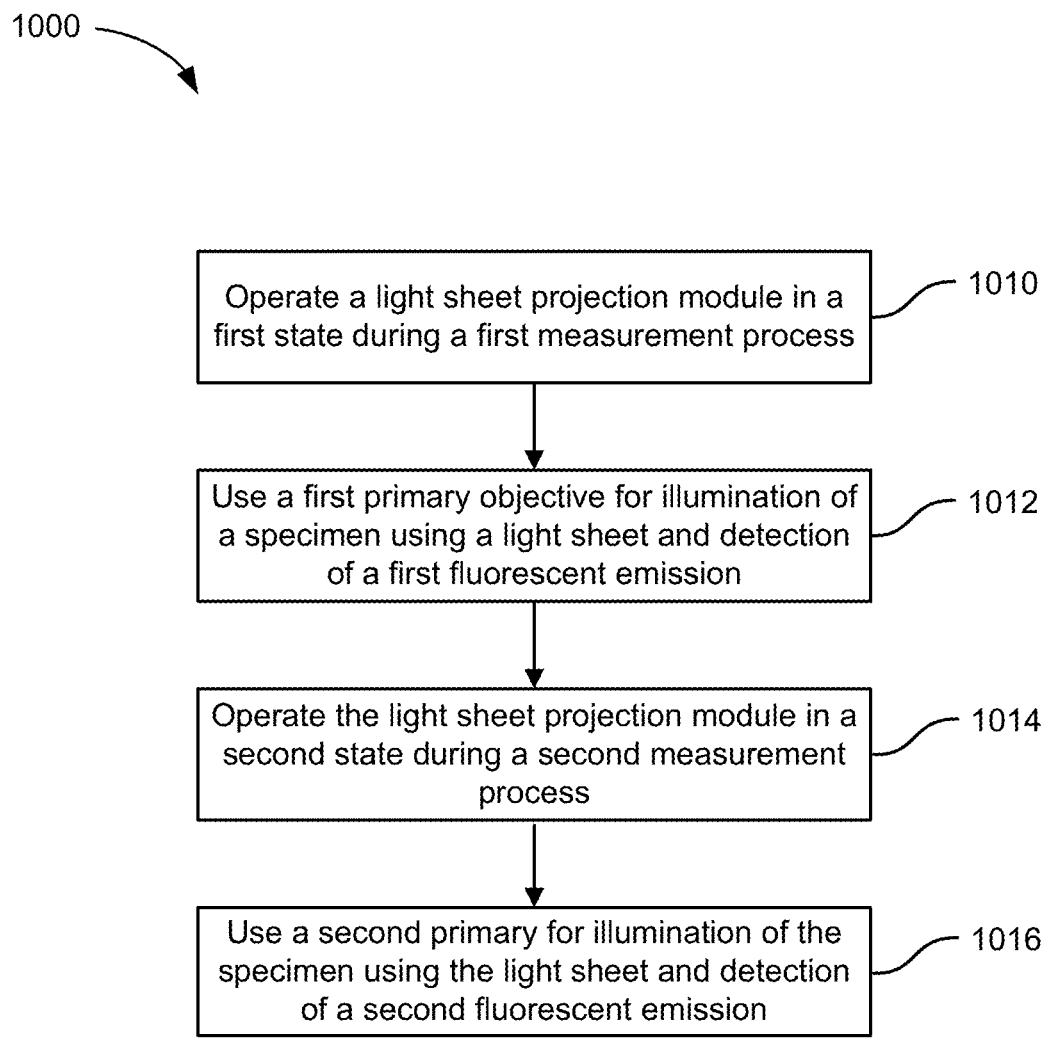
FIG. 10 is a simplified flowchart illustrating a method of performing imaging of a specimen according to an embodiment of the present invention.

FIG. 10 is a simplified flowchart illustrating a method of performing imaging, i.e., forming a three-dimensional image, of a specimen, according to an embodiment of the present invention. This method provides a variation on the method illustrated in FIGS. 6A-6G. Rather than collecting two volumetric images using a first primary objective and forming a fused intermediate image, collecting two volumetric images using a second primary objective and forming a second fused intermediate image, and then fusing the intermediate images to form a fused image, the sequence of volumetric image collection is modified. In the embodiment illustrated in FIG. 10, a first volumetric image is collected using a first primary objective and a second volumetric image is collected using a second primary objective. Referring to FIGS. 6A and 6D, these two volumetric images are illustrated and they can be fused to provide a multi-view image. In order to collect images from a different scan direction, an orientation control module can be utilized to re-orient the light sheet to a different scan angle, for example, an equal and opposite scan angle. Then, third and fourth volumetric images can be collected, similar to those illustrated in FIGS. 6B and 6E. Accordingly, using this alternative image collection sequence, a fused image formed using four volumetric images can be obtained.

The method includes operating a light sheet projection module in a first state during a first measurement process (1010) and using a first primary objective for illumination of a specimen using a light sheet and detection of a first fluorescent emission (1012). In some embodiments, an orientation control module is operated in a first state during the first measurement process and during the second measurement process.

The method also includes operating the light sheet projection module in a second state during a second measurement process (1014) and using a second primary objective for illumination of the specimen using the light sheet and detection of a second fluorescent emission (1016).

In an alternative embodiment, the method can include operating the orientation control module in a second state during a third measurement process and a fourth measurement process. During the third measurement process, the light sheet projection module is operated in the first state and the first primary objective is used for illumination of the specimen using the light sheet and detection of a third fluorescent emission. During the fourth measurement process, the light sheet projection module is operated in the second state and the second primary objective is used for illumination of the specimen using the light sheet and detection of a fourth fluorescent emission.

The light sheet can be scanned in a first direction during the first measurement process and the second measurement process. The light sheet can be scanned in a second direction during the third measurement process and the fourth measurement process. In these embodiments, the first direction is oriented with respect to a first angle to an optical axis, the second direction is oriented with respect to a second angle to the optical axis, and an absolute value of the first angle is equal to an absolute value of the second angle. The first primary objective and the second primary objective can be disposed along the optical axis.

It should be appreciated that the specific steps illustrated in FIG. 10 provide a particular method of performing imaging of a specimen according to an embodiment of the present invention. Other sequences of steps may also be performed according to alternative embodiments. For example, alternative embodiments of the present invention may perform the steps outlined above in a different order. Moreover, the individual steps illustrated in FIG. 10 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 11:
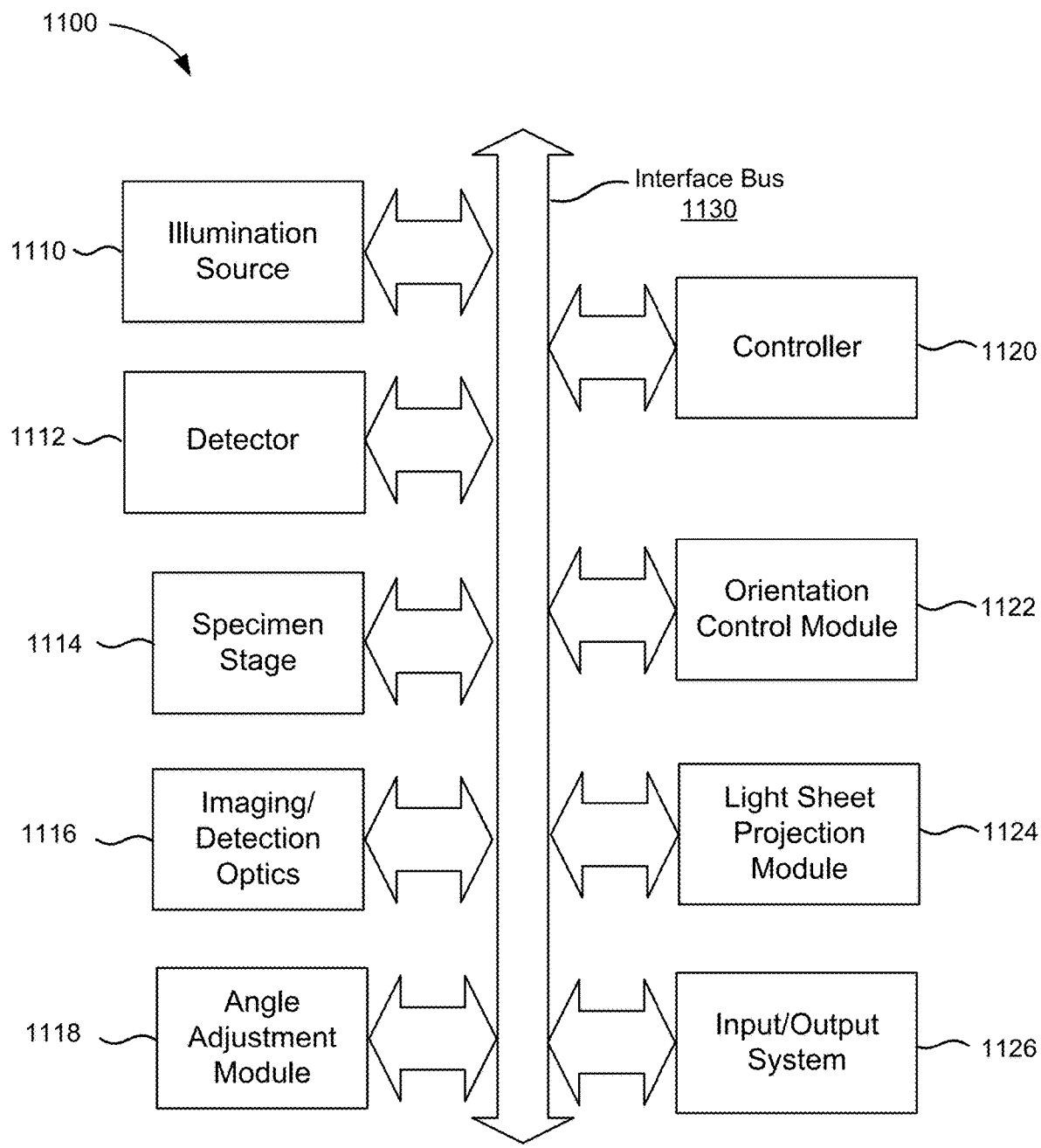
FIG. 11 is a simplified schematic diagram illustrating a multi-view, episcopic, selective-plane illumination microscope system according to an embodiment of the present invention.

FIG. 11 is a simplified schematic diagram illustrating a multi-view, episcopic, selective-plane illumination microscope system according to an embodiment of the present invention. The multi-view, episcopic selective-plane illumination microscope system 1100 includes an illumination source 1110, which can include one or more laser sources operable to generate fluorescent excitation signals at predetermined wavelengths. Thus, illumination light provided by illumination source 1110 can be generated at a plurality of illumination wavelengths, for example, over predetermined wavelength bands or at predetermined wavelengths. Illumination optics are utilized to generate a light sheet as described herein.

Multi-view, episcopic, selective-plane illumination microscope system 1100 also includes detector 1112 and specimen stage 1114. Illumination light, for example, at a predetermined wavelength, can impinge as a light sheet on a specimen supported on specimen stage 1114. In the embodiment illustrated in FIG. 11, an episcopic system is illustrated that includes imaging/detection optics, shown as objectives 140 and 150 in FIG. 1A. Thus, in this embodiment, illumination light is directed toward the specimen and light reflected/emitted from the specimen is detected using the same objective. By translating the specimen and/or the light sheet, a series of images of the specimen can be collected, thereby providing a volumetric image of the specimen. Additionally, by using two or more objectives, image fusion techniques can be utilized to generate a fused image based on multiple volumetric images.

Multi-view, episcopic, selective-plane illumination microscope system 1100 further includes angle adjustment module 1118, orientation control module 1122, and light sheet projection module 1124. As described herein, angle adjustment module 1118 is utilized to orient the light sheet at an angle with respect to the optical axis passing through imaging/detection optics 1116 and the specimen, orientation control module 1122 is utilized to modify the orientation of the light sheet, providing either discrete angles or continuous angle variation with respect to the optical axis. Thus, multi-orientation imaging is provided by embodiments of the present invention. Additionally, multi-view, episcopic, selective-plane illumination microscope system 1100 includes light sheet projection module 1124, which is utilized to direct the illumination light to impinge either on a first side of the specimen or a second side of the specimen, thereby providing multi-view imaging.

Multi-view, episcopic, selective-plane illumination microscope system 1100 additionally includes controller 1120 and an input/output system 1126. Controller 1120, which can be a computer controller, is utilized to operate the various system elements, for example, controlling motion/rotation of specimen stage 1114 during image collection, as well as other system elements. The various elements of multi-view, episcopic, selective-plane illumination microscope system 1100 are connected via interface bus 1130, which provides for control and data signals to be transmitted to/from and received to/from one or more of the various elements.

FIG. 12A is a photograph illustrating an x-y projection of a multi-view image of a zebrafish tail. For this image, the imaging volume is 1064 µm×532 µm×287 µm and includes 4000×2000×360 voxels per view for a total of 5.7 billion voxels that were acquired every 40 seconds. FIG. 12B is a photograph illustrating a side projection of the zebrafish tail. In the side projection illustrated in FIG. 12B, which is a cross-section through the x-y plane, light sheet 1 and light sheet 2 impinge on the specimen at 45° to the vertical axis to reach a given point within the specimen. Depending on the specimen geometry and placement, one of the two light-sheets will have a shorter path to reach the given point and, hence, be less susceptible to absorption, refraction or scattering. Consequently, the view corresponding to one of the light sheets will be more complete and have better contrast.

FIGS. 12C and 12D are photographs associated with light sheet 1 and light sheet 2, respectively at a first imaging location. In FIG. 12C, which is associated with light sheet 1 and location 2 in FIG. 12A, higher resolution and contrast is achieved than is achieved in FIG. 12D, which is associated with light sheet 2. Accordingly, light sheet 1 produces better images at location 2, which is located at one side of the zebrafish tail specimen. FIGS. 12E and 12F are photographs associated with light sheet 1 and light sheet 2, respectively at a second imaging location. In FIG. 12F, which is associated with light sheet 2 and location 5 in FIG. 12A, higher resolution and contrast is achieved than is achieved in FIG. 12E, which is associated with light sheet 1. Accordingly, light sheet 2 produces better images at location 5, which is located at the other side of the zebrafish tail specimen. Accordingly, these figures demonstrate the complementarity of the two views obtained using two light sheets.

Although a single zebrafish embryo tail is imaged in FIGS. 12A and 12B, embodiments of the present invention enable wide field of view imaging in which multiple specimens can be imaged concurrently. As an example, the inventors have imaged nine zebrafish embryos at a time. The embryos were imaged sequentially (i.e., at 4.5 minutes/round) for up to 8 hours. All the embryos developed normally and were imaged as 3D volumetric images as a maximum intensity projection and color-coded for depth, thereby illustrating the imaging reproducibility across multiple specimens in a high-throughput system.

FIGS. 13A-13E are spatio-temporal images showing cell division according to an embodiment of the present invention. The images are of a single x-y plane slice and the time difference between each of the images illustrated in FIGS. 13A and 13E is 40 seconds. Thus, as illustrated in FIGS. 13A-13E, the marked cell is imaged at 40 second intervals, showing cell division after 160 seconds. As demonstrated by this set of images, embodiments of the present invention make it possible to follow the intermediate steps during mitosis, which is an important capability for achieving, for example, accurate lineage tracking.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A multi-view selective plane imaging microscope comprising:
   an illumination source;
   an image detector;
   a specimen stage operable to support a specimen having a first side and a second side opposing the first side, wherein an optical axis is disposed normal to the specimen;
   a first objective disposed along the optical axis on the first side of the specimen;
   a second objective disposed along the optical axis on the second side of the specimen;
   an angle adjustment module operable to position a light sheet at a predetermined angle with respect to the optical axis;
   a light sheet projection module operable to direct the light sheet to either the first objective or the second objective; and
   an orientation control module operable to modify a scan direction of the light sheet.

2. The multi-view selective plane imaging microscope of claim 1 wherein the light sheet projection module is operable to direct the light sheet to impinge on:
   the first side of the specimen during collection of a first set of volumetric images; and
   the second side of the specimen during collection of a second set of volumetric images.

3. The multi-view selective plane imaging microscope of claim 2 wherein the first set of volumetric images are collected using the first objective.

4. The multi-view selective plane imaging microscope of claim 2 wherein the second set of volumetric images are collected using the second objective.

5. The multi-view selective plane imaging microscope of claim 1 wherein the optical axis passes through the specimen.

6. The multi-view selective plane imaging microscope of claim 2 wherein the orientation control module is:
   disposed in a first state during collection of a first volumetric image of the first set of volumetric images and in a second state during collection of a second volumetric image of the first set of volumetric images; and
   disposed in the first state during collection of a first volumetric image of the second set of volumetric images and in the second state during collection of a second volumetric image of the second set of volumetric images.

7. A fluorescence imaging system comprising:
   a fluorescent excitation source optically coupled to illumination optics, wherein the fluorescent excitation source and the illumination optics are operable to provide a light sheet;
   a specimen stage operable to support a specimen having a first side and a second side opposing the first side;
   an excitation path disposed between the illumination optics and the specimen stage;
   an angle adjustment module disposed along the excitation path and operable to modify a scan angle of the light sheet;
   an orientation control module disposed along the excitation path and operable to modify a scan direction of the light sheet;
   a first objective disposed on the first side of the specimen;
   a second objective disposed on the second side of the specimen;
   a light sheet projection module disposed along the excitation path and operable to either:
      project the light sheet to pass through the first objective and impinge on the first side of the specimen; or
      project the light sheet to pass through the second objective and impinge on the second side of the specimen; and
   an image detector optically coupled to detection optics.

8. The fluorescence imaging system of claim 7 wherein fluorescent emission from the first side of the specimen passes through the first objective.

9. The fluorescence imaging system of claim 8 wherein fluorescent emission from the second side of the specimen passes through the second objective.

10. The fluorescence imaging system of claim 9 wherein:
    the fluorescent emission from the first side of the specimen propagates along at least a portion of the excitation path; or
    the fluorescent emission from the second side of the specimen propagates along at least a portion of the excitation path.

11. The fluorescence imaging system of claim 7 wherein the specimen stage is characterized by a specimen plane aligned with an x-y plane, the first objective is disposed a first distance from the specimen plane measured along a positive z-axis, and the second objective is disposed at a second distance from the specimen plane measured along a negative z-axis.

12. The fluorescence imaging system of claim 11 wherein an optical axis of the first objective and an optical axis of the second objective are collinear.

13. The fluorescence imaging system of claim 7 wherein the angle adjustment module comprises a tiltable reflector.

14. The fluorescence imaging system of claim 7 wherein the angle adjustment module comprises a translatable reflector.

15. The fluorescence imaging system of claim 7 wherein the orientation control module comprises a set of moveable reflectors and a fixed reflector.

16. The fluorescence imaging system of claim 15 wherein the set of moveable reflectors are operable to:
    reflect light to the fixed reflector and reflect light from the fixed reflector, respectively, in a first state; and
    not reflect light to the fixed reflector or reflect light from the fixed reflector, respectively, in a second state.

17. The fluorescence imaging system of claim 7 wherein the orientation control module comprises a set of tiltable reflectors and a set of three fixed reflectors.

18. The fluorescence imaging system of claim 17 wherein the set of tiltable reflectors are operable to:
    reflect light to one of the fixed reflectors in a first state; and
    reflect light to a second of the fixed reflectors and reflect light from a third of the fixed reflectors, respectively, in a second state.

19. The fluorescence imaging system of claim 7 wherein the light sheet projection module comprises a tiltable reflector.

* * * * *

UNITED STATES PATENT AND TRADEMARK OFFICE
CERTIFICATE OF CORRECTION

PATENT NO. : 12,320,966 B2
APPLICATION NO. : 18/162067
DATED : June 3, 2025
INVENTOR(S) : Bin Yang and Loic Royer Page 1 of 1

It is certified that error appears in the above-identified patent and that said Letters Patent is hereby corrected as shown below:

On the Title Page

Column 1, Item (71) Applicant:
Delete "Chan Zuckerberg Biohub, Inc.," and
Insert -- CZ Biohub SF, LLC, --.

Signed and Sealed this
Twenty-ninth Day of July, 2025

Coke Morgan Stewart
*Acting Director of the United States Patent and Trademark Office*